(12) United States Patent
Weintraub et al.

(10) Patent No.: US 9,982,511 B2
(45) Date of Patent: May 29, 2018

(54) DIRTY FLUID PRESSURE REGULATOR AND CONTROL VALVE

(71) Applicant: Proserv Operations, Inc., Houston, TX (US)

(72) Inventors: Preston Weintraub, Spring, TX (US); Joseph Quackenbush, Houston, TX (US)

(73) Assignee: PROSERV OPERATIONS, INC., Houston, TX (US)

( * ) Notice: Subject to any disclaimer, the term of this patent is extended or adjusted under 35 U.S.C. 154(b) by 646 days.

(21) Appl. No.: 14/580,419

(22) Filed: Dec. 23, 2014

(65) Prior Publication Data

US 2015/0191997 A1     Jul. 9, 2015

Related U.S. Application Data

(60) Provisional application No. 61/923,387, filed on Jan. 3, 2014.

(51) Int. Cl.
| | | |
|---|---|---|
| F16K 11/07 | (2006.01) | |
| E21B 34/10 | (2006.01) | |
| F16K 3/18 | (2006.01) | |
| E21B 21/10 | (2006.01) | |

(52) U.S. Cl.
CPC .......... *E21B 34/101* (2013.01); *E21B 21/103* (2013.01); *F16K 3/188* (2013.01); *F16K 11/0712* (2013.01)

(58) Field of Classification Search
CPC ..... F16K 3/188; F16K 11/0712; E21B 34/101
See application file for complete search history.

(56) References Cited

U.S. PATENT DOCUMENTS

| | | | |
|---|---|---|---|
| 3,635,436 A * | 1/1972 | Tillman | ................. F16K 39/04 251/159 |
| 4,396,071 A | 8/1983 | Stephens | |
| 4,444,216 A | 4/1984 | Loup | |
| 4,475,568 A | 10/1984 | Loup | |
| 4,493,335 A | 1/1985 | Watson | |
| 4,554,940 A | 11/1985 | Loup | |
| 4,856,557 A | 8/1989 | Watson | |
| 6,651,696 B2 * | 11/2003 | Hope | ................. F16K 17/046 137/469 |

(Continued)

OTHER PUBLICATIONS

U.S. Appl. No. 14/067,398 filed Oct. 30, 2013, Weintraub et al.

*Primary Examiner* — Kevin Murphy
(74) *Attorney, Agent, or Firm* — Patterson & Sheridan, L.L.P.

(57) ABSTRACT

A pressure regulator for dirty fluid service includes: a body having a chamber, a pair of supply sockets, and an outlet port, each socket and the port formed through a wall of the body; a pair of supply seal plates disposed in the supply sockets and having supply passages formed therethrough; and a sliding seal assembly disposed in the chamber. The sliding seal assembly includes: a seal carrier having a piston and a supply gland; and a supply seal disposed in the supply gland. The piston is disposed in a pilot portion of the chamber. The outlet port and sockets are located adjacent to a regulated portion of the chamber. The piston is operable to move the sliding seal assembly between a supply position and a second position in response to pressure differential between the pilot portion and the regulated portion.

10 Claims, 10 Drawing Sheets

(56) References Cited

U.S. PATENT DOCUMENTS

| | | |
|---|---|---|
| 6,983,803 B2 | 1/2006 | Watson et al. |
| 7,000,890 B2* | 2/2006 | Bell .................... E21B 33/0355 251/129.15 |
| 7,073,590 B2* | 7/2006 | Neugebauer .......... E21B 49/081 166/169 |
| 7,520,297 B2* | 4/2009 | Bell ....................... G05D 16/10 137/505 |
| 7,784,553 B2 | 8/2010 | Moreno |
| 2011/0253240 A1* | 10/2011 | Otto ........................ E21B 21/10 137/625.48 |

* cited by examiner

DIRTY FLUID PRESSURE REGULATOR AND CONTROL VALVE

BACKGROUND OF THE DISCLOSURE

Field of the Disclosure

The present disclosure generally relates to a dirty fluid pressure regulator and control valve.

Description of the Related Art

Downhole tools are frequently used in the drilling of a crude oil and/or natural gas well. Such tools may be operated by drilling fluid pumped down a drill string. The operation of such tools may require an onboard pressure regulator to smooth pressure fluctuations and step down pressure in the drill string and/or an onboard control valve to selectively operate various functions of a downhole tool of a tool string, such as a bottomhole assembly. The drilling fluid may include a base liquid, such as refined or synthetic oil, water, brine, or a water/oil emulsion. The drilling fluid may further include solids suspended in the base liquid, such as organophilic clay, lignite, and/or asphalt, thereby forming a mud.

Prior art pressure regulators include supply, vent, and function ports allowing for incoming and outgoing pressurized fluid flow to operate a fluid-driven tool. The supply and vent ports are selectively opened and closed by seal rings attached to a seal carrier that is located within the chamber of the regulator. The seal rings move with the seal carrier for selective alignment with the ports. The seal carrier is moved by a spring-driven piston. The supply and vent ports are formed through seal plates and the seal rings are biased into engagement with the seal plates by energization springs.

As the fluid-driven tool consumes the pressurized fluid, the spring-driven piston moves the seal carrier to clear the supply seal ring from the supply port and to align the vent seal ring with the vent port, thereby allowing the fluid to enter the regulator from the supply port. Conversely, when the internal pressure of the regulator is greater than the set point, the spring-driven piston moves the seal carrier to align the supply seal ring with the supply port and clear the vent seal ring from the vent port, thereby protecting the fluid-driven tool from overpressure.

Reliance on the spring-driven piston to move the seal carrier requires that a regulator include a large chamber. A large chamber causes the prior art regulators to be bulkier and less streamlined making them unsuitable for fitting within walls of or annuli between oilfield tubulars. Further, the seal rings and seal plates of the prior art regulators are made from metal which is subject to abrasion by particulates of the drilling mud lodging between the seal plates and the seal rings.

Further, the traditional seal plates and rings result in significant friction resisting movement of the seal carrier. This friction constrains the ability to regulate high pressure with the desired low "dead band". Dead band is an industry term that describes the change in outlet pressure required to generate a dynamic response from the regulator. The traditional subsea regulator design results in high dead band which produces highly variable working pressures.

It is thus desirable to provide a regulator that reliably and accurately regulates pressure at or near the set point with low dead band while being resistant to solids and which can be scaled down to small sizes suitable for downhole use.

SUMMARY OF THE DISCLOSURE

The present disclosure generally relates to a dirty fluid pressure regulator and control valve. In one embodiment, a pressure regulator for dirty fluid service includes: a body having a chamber, a pair of supply sockets, and an outlet port, each socket and the port formed through a wall of the body; a pair of supply seal plates disposed in the supply sockets and having supply passages formed therethrough; and a sliding seal assembly disposed in the chamber. The sliding seal assembly includes: a seal carrier having a piston and a supply gland; and a supply seal disposed in the supply gland. The piston is disposed in a pilot portion of the chamber. The outlet port and sockets are located adjacent to a regulated portion of the chamber. The piston is operable to move the sliding seal assembly between a supply position and a second position in response to pressure differential between the pilot portion and the regulated portion.

In another embodiment, a control valve for dirty fluid service includes: a body having a pair of sockets and a port, each socket and the port formed through a wall of the body; a pair of seal plates disposed in the sockets and having passages formed therethrough; and a sliding seal assembly. The sliding seal assembly includes: a seal carrier disposed in a bore of the body, having first and second seal shoulders forming a chamber therein, and having a gland; a seal disposed in the gland; and a piston connected to the seal carrier. The outlet port and sockets are located adjacent to the chamber. The piston is operable to move the sliding seal assembly between an open position and a closed position in response to fluid communication with a hydraulic power unit.

In another embodiment, a control valve for dirty fluid service includes: a body having a pair of supply sockets, a pair of vent sockets, and a port, each socket and the port formed through a wall of the body; a pair of supply seal plates disposed in the supply sockets and having passages formed therethrough; a pair of vent seal plates disposed in the vent sockets and having passages formed therethrough; and a sliding seal assembly. The sliding seal assembly includes: a seal carrier disposed in a bore of the body, having first and second pistons forming a chamber therein, and having a supply and a vent gland; a supply seal disposed in the supply gland; a vent seal disposed in the vent gland. The outlet port and sockets are located adjacent to the chamber. The pistons are operable to move the sliding seal assembly between a supply position and a vent position in response to fluid communication with a hydraulic power unit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
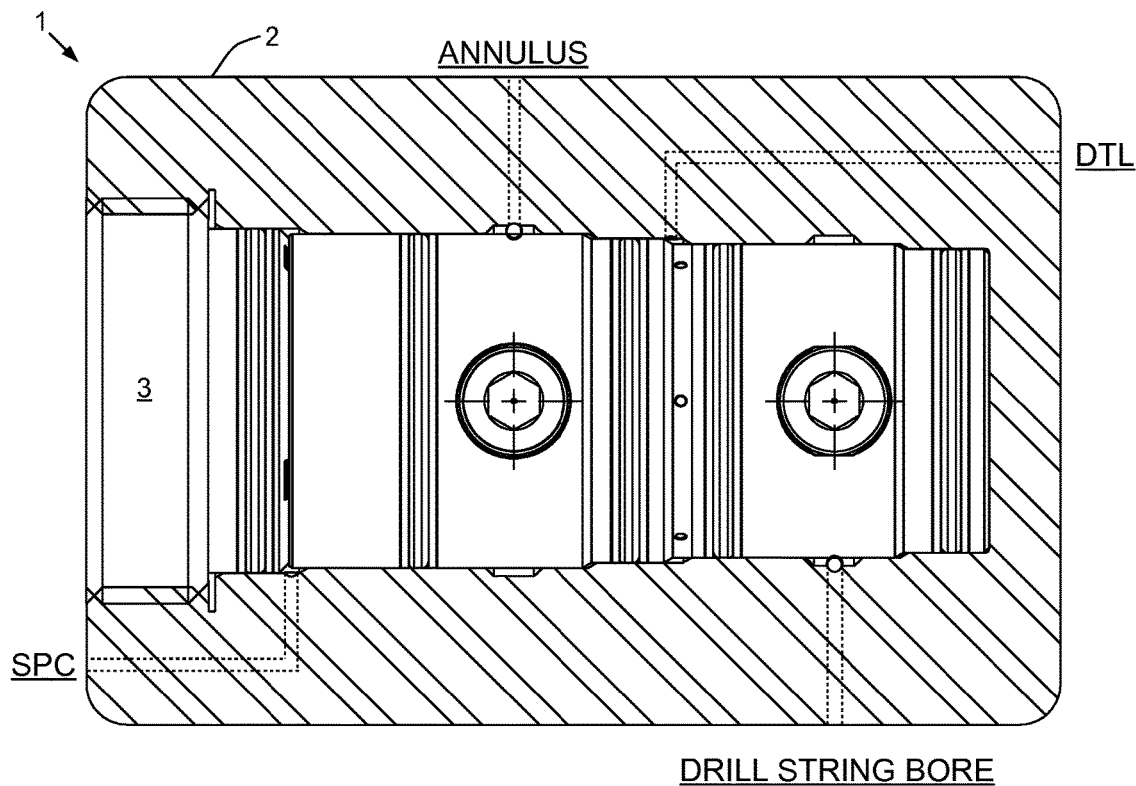
FIG. 1A illustrates a dirty fluid regulator, according to one embodiment of the present disclosure.
Figure 1B:
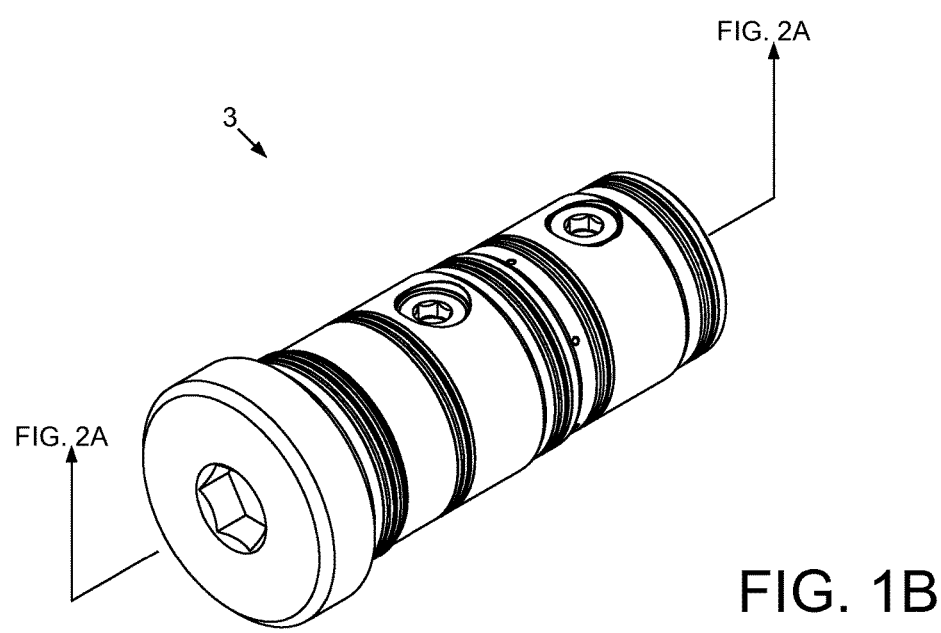
FIG. 1B illustrates a cartridge of the regulator.

FIG. 1A illustrates a dirty fluid regulator 1, according to one embodiment of the present disclosure. FIG. 1B illustrates a cartridge 3 of the regulator. Unless otherwise specified, parts, other than seals and backup rings, of the regulator 1 may each be made from a high strength metal or alloy, such as steel, stainless steel, nickel-chromium alloy, or cobalt-nickel-chromium alloy. Unless otherwise specified, seals may be made from an elastomer or elastomeric copolymer. Backup rings may be made from an engineering polymer.

The regulator 1 may include the cartridge 3 and a control sub 2 of a drill string for operating a downhole tool DTL of the drill string. The control sub 2 may be tubular and have a pocket formed in a wall thereof for receiving the cartridge 3. The cartridge 3 may be disposed in the pocket and connected to the control sub 2, such as by engagement of an outer threaded coupling of the cartridge 3 with an inner threaded coupling of the pocket. A closed end of the cartridge 3 may also bear against a closed end of the pocket. The control sub 2 may further have a set point chamber SPC formed in the wall thereof and in fluid communication with the cartridge 3 via a pilot passage formed in the wall between the set point chamber SPC and the pocket. The set point chamber may be a gas chamber charged to an operating pressure or operating pressure differential of the downhole tool DTL by a gas, such as nitrogen, or an accumulator charged to an operating pressure of the downhole tool DTL by hydraulic fluid, such as refined and/or synthetic oil. The control sub 2 may be located along the drill string adjacent to the downhole tool DTL and both may be part of a bottomhole assembly.

The control sub 2 may further have a vent passage extending between the pocket and an exterior thereof for providing fluid communication between the cartridge 3 and an annulus formed between the drill string and a wellbore (not shown). The control sub 2 may further have an inlet passage extending between the pocket and a bore formed therethrough for providing fluid communication between the cartridge 3 and a bore of the drill string. During drilling of the wellbore, drilling fluid, such as mud 17 (FIG. 2A), may be pumped through the drill string bore and exit a drill bit (not shown) located at a bottom of the drill string. The exiting drilling mud 17 may carry cuttings (collectively referred to as returns) from the bit to a fluid handling system (not shown) of a drilling rig (not shown). Due to pressure drop across the drill bit and/or other components of the bottomhole assembly, pressure in the drill string bore may be substantially greater than pressure in the annulus.

The control sub 2 may further have an outlet passage extending between the pocket and the downhole tool DTL for providing fluid communication between the cartridge 3 and the downhole tool.

Figure 2A:
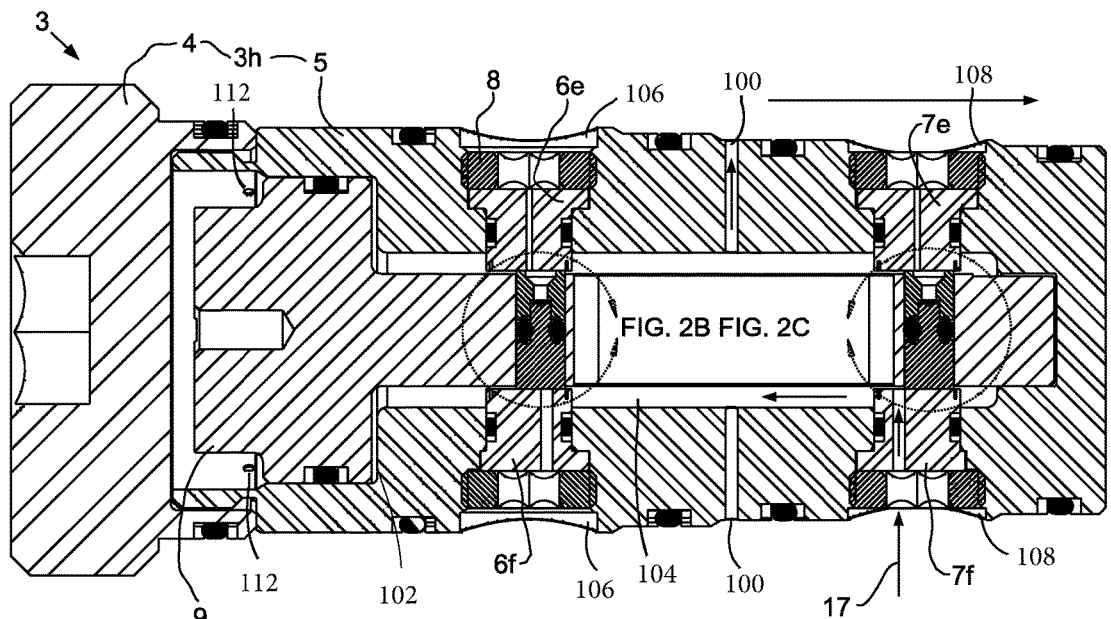
FIG. 2A is a cross section of FIG. 1B with the regulator in a supply position.
Figure 2B:
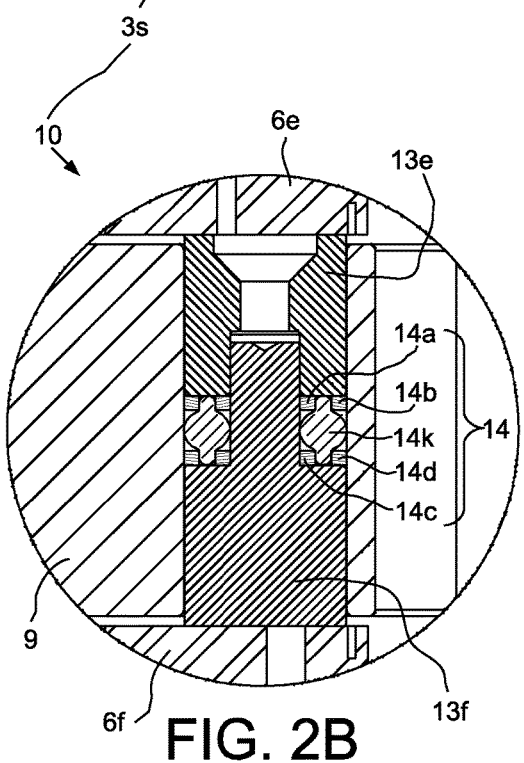
FIGS. 2B and 2C are enlargements of FIG. 2A.
Figure 2C:
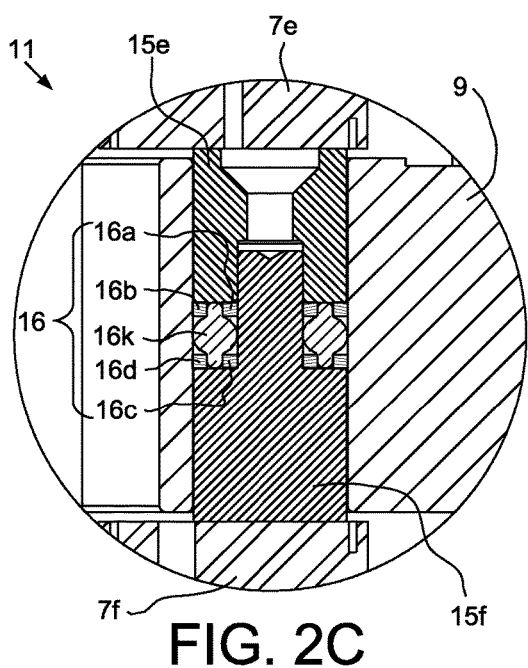

FIG. 2A is a cross section of FIG. 1B with the regulator 1 in a supply position. FIGS. 2B and 2C are enlargements of FIG. 2A. The cartridge 3 may include a housing 3h and a sliding seal assembly 3s longitudinally movable relative to the housing between the supply position (shown), a vent position (FIG. 3A), and a equilibrium position (FIG. 3B). The housing 3h may include a cap 4, a body 5, a pair of vent seal plates 6e,f, a pair of supply seal plates 7e,f, and a retainer, such as a nut 8, for each of the seal plates. The sliding seal assembly 3s may include a carrier 9, a vent seal 10, and a supply seal 11.

The body 5 may be tubular having a longitudinal chamber formed therein from an open end thereof to a location adjacent a closed end thereof. The chamber may be cylindrical and have a pilot portion 102 with a first diameter and a regulated portion 104 with a second diameter substantially less than the first diameter. The body 5 may have a shoulder formed in an inner surface thereof at an interface between the pilot and regulated portions 102, 104 of the chamber. The body 5 may have vent sockets 106 formed radially through a wall thereof and providing fluid communication between the pocket and the regulated portion. The body 5 may also have supply sockets 108 formed radially through the wall thereof and providing fluid communication between the pocket and the regulated portion. The body 5 may also have one or more (pair shown) pilot ports 112 formed through the wall thereof and providing fluid communication between the pocket and the pilot portion. The body 5 may also have one or more (pair shown) outlet ports 100 formed through the wall thereof and providing fluid communication between the pocket and the regulated portion. The body 5 may also have a guide receptacle formed in the closed lower end thereof adjacent to an end of the regulated portion. The guide receptacle may have a torsional coupling formed in an inner surface thereof. The body 5 may also have a lap joint formed in an outer surface thereof adjacent to the open end thereof.

The cap 4 may have the outer threaded coupling formed in an outer surface thereof at a portion distal from the body 5 for connection of the cartridge 3 to the control sub 2. The cap 4 may also have a torsional socket formed in a face thereof distal from the body 5. The cap 4 may also have a lap joint formed in an inner surface thereof at a portion adjacent to the body 5 for mating with the lap joint of the body, thereby trapping the body between the cap and the closed end of the pocket. The cap 4 may also have one or more pilot ports (pair shown in FIG. 1A) for facilitating fluid communication between the pocket and the pilot portion of the body chamber.

The cap 4 may also have a seal groove formed in the outer surface of the portion adjacent to the body 5 and a seal assembly 12a (numbered in FIG. 3B) may be disposed therein for engagement with a side of the pocket. The seal assembly 12a may include a seal, such as an o-ring, and a pair of backup rings straddling the o-ring. The body 5 may also have a seal groove formed in the outer surface thereof between the vent sockets and the lap joint and a seal assembly 12b (numbered in FIG. 3B) may be disposed therein for engagement with the side of the pocket. The seal assembly 12b may include a seal, such as an o-ring, and a pair of backup rings straddling the o-ring. The seal assemblies 12a,b may straddle the pilot ports of the body 5 and the cap 4.

The body 5 may also have a seal groove formed in the outer surface thereof between the vent sockets and the outlet ports and a seal assembly 12c (numbered in FIG. 3B) may be disposed therein for engagement with the side of the pocket. The seal assembly 12c may include a seal, such as an o-ring, and a pair of backup rings straddling the o-ring. The seal assemblies 12b,c may straddle the vent sockets of the body 5. The body 5 may also have a seal groove formed in the outer surface thereof between the supply sockets and the outlet ports and a seal assembly 12d (numbered in FIG. 3B) may be disposed therein for engagement with the side of the pocket. The seal assembly 12d may include a seal, such as an o-ring, and a pair of backup rings straddling the o-ring. The seal assemblies 12c,d may straddle the outlet ports of the body 5. The body 5 may also have a seal groove formed in the outer surface thereof between the supply sockets and the closed lower end thereof and a seal assembly 12e (numbered in FIG. 3B) may be disposed therein for engagement with the side of the pocket. The seal assembly 12e may include a seal, such as an o-ring, and a pair of backup rings straddling the o-ring. The seal assemblies 12d,e may straddle the supply sockets of the body 5.

The vent seal plates 6e,f may each be round plugs having a flange and a stem extending from the flange. Each vent socket of the body 5 may have an outer thread, an inner seal bore, and a mid shoulder connecting the thread and seal bore. The vent seal plates 6e,f may have seal grooves formed in the stems thereof and seal assemblies 12g,h (numbered in FIG. 3B) may be disposed therein for engagement with the seal bores of the respective vent sockets. Each seal assembly 12g,h may include a seal, such as an o-ring, and a pair of backup rings straddling the o-ring. Inner faces of the flanges of the vent seal plates 6e,f may mate with the shoulders of the respective vent sockets of the body 5. Screwing of the nuts 8 into the respective threads of the vent sockets may engage inner faces of the nuts with outer faces of the respective flanges of the vent seal plates 6e,f, thereby fastening the vent seal plates to the body 5. The stems of the vent seal plates 6e,f may extend past the body inner surface and protrude into the regulated portion of the body chamber. The vent seal plate 6e may have a central energization passage formed therethrough and the vent seal plate 6f may have an eccentric flow passage formed therethrough. The flow passage may have a diameter greater or substantially greater than the energization passage.

The supply seal plates 7e,f may each be round plugs having a flange and a stem extending from the flange. Each supply socket of the body 5 may have an outer thread, an inner seal bore, and a mid shoulder connecting the thread and seal bore. The supply seal plates 7e,f may have seal grooves formed in the stems thereof and seal assemblies 12i,j (numbered in FIG. 3B) may be disposed therein for engagement with the seal bores of the respective supply sockets. Each seal assembly 12i,j may include a seal, such as an o-ring, and a pair of backup rings straddling the o-ring. Inner faces of the flanges of the supply seal plates 7e,f may mate with the shoulders of the respective supply sockets of the body 5. Screwing of the nuts 8 into the respective threads of the supply sockets may engage inner faces of the nuts with outer faces of the respective flanges of the supply seal plates 7e,f, thereby fastening the supply seal plates to the body 5. The stems of the supply seal plates 7e,f may extend past the body inner surface and protrude into the regulated portion of the body chamber. The supply seal plate 7e may have a central energization passage formed therethrough and the supply seal plate 7f may have an eccentric flow passage formed therethrough. The flow passage may have a diameter greater or substantially greater than the energization passage.

Each of the supply and vent seal plates 6f, 7f and the respective body sockets may have an orientation profile, such as a key and keyway, to ensure that the eccentric flow passages thereof are correctly oriented.

The seal carrier 9 may be a round shaft having an enlarged piston disposed in the pilot portion of the body chamber, a vent gland extending from the piston into the regulated portion of the body chamber, a supply gland disposed in the regulated portion of the body chamber, a sleeve connecting the supply and vent glands, and a guide extending from the supply gland into the guide receptacle of the body 5. The piston of the seal carrier 9 may have a seal groove formed in an outer surface thereof and a seal assembly 12f (numbered in FIG. 3B) may be disposed therein for engagement with the pilot portion of the body chamber. The seal assembly 12f may include a seal, such as an o-ring, and a pair of backup rings straddling the o-ring. An outer diameter of the glands and sleeve of the seal carrier 9 may be less or substantially less than an inner diameter of the regulated portion of the body chamber, thereby defining an annular flow path therethrough. The guide portion of the seal carrier 9 may have a torsional profile mating with the torsional profile of the body guide receptacle, thereby torsionally connecting the seal carrier to the body 5 while allowing longitudinal movement therebetween.

The vent seal 10 may extend through a seal bore of the carrier vent gland and include a pair of opposed mechanical seals 13e,f and a spring-seal 14 disposed between the mechanical seals. Each mechanical seal 13e,f may be made from an abrasion resistant material, such as a ceramic-metal composite (aka cermet). The cermet may be tungsten carbide. The vent seal plates 6e,f may also be made from the abrasion resistant material. An energization mechanical seal 13e may be a ring and a flow mechanical seal 13f may be a round peg. The flow seal peg 13f may have a larger disk adjacent to the vent seal plate 6f, a smaller pin adjacent to the energization seal ring 13e, and a shoulder connecting the pin and disk. A bore of the mechanical seal ring 13e may have a larger diameter in a portion adjacent to the energization seal plate 6e and may funnel to a smaller diameter in a mid portion thereof before increasing to a mid diameter in a portion adjacent to the spring-seal 14 for receiving an end of the pin of the flow seal peg 13f. An outer diameter of the vent seal 10 may correspond to, such as being slightly greater than, a stroke of the sliding seal assembly 3s between the supply and vent positions such that the mechanical seal ring bore is in alignment with the energization passage of the vent seal plate 6e at and between the supply and vent positions.

The spring-seal 14 may include a key seal 14k, a pair of backup rings 14a,b adjacent to a face of the energization seal ring 13e, and a pair backup rings 14c,d adjacent to the shoulder of the flow seal peg 13f. Each pair of backup rings 14a-d may straddle respective portions of the key seal 14k. The spring-seal 14 may be disposed between and have ends pressing against the opposing face and shoulder of the mechanical vent seals 13e,f, thereby operating as a compression spring biasing the mechanical supply seals away from each other and into engagement with the respective vent seal plates 6e,f. The key seal 14k may be in engagement with the seal bore of the vent gland and the pin of the flow seal peg 13f, thereby selectively isolating an inner interface between the mechanical vent seals 13e,f and selectively isolating an outer interface between the mechanical vent seals and the seal bore of the vent gland.

The key seal 14k may be a ring having a composite shaped cross section. The cross section may have a mid circular seal portion, a first lobe extending from the mid seal portion to the adjacent face of the energization seal ring 13e, and a second lobe extending from the mid seal portion to the shoulder of the flow seal peg 13f. The lobes may be aligned with the mid portion. A thickness of the mid portion may be greater or substantially greater than, such as three-halves or twice, the thickness of each lobe. Each lobe may have a rectangular portion connecting to the seal portion and a rounded end distal from the seal portion. Each pair of backup rings 14a-d may straddle the respective lobe.

The supply seal 11 may be identical to the vent seal 10 and include a pair of opposed mechanical seals 15e,f and a spring-seal 16 disposed between the mechanical seals. The spring-seal 16 may include a key seal 16k, a pair of backup rings 16a,b adjacent to a face of the energization seal ring 15e, and a pair backup rings 16c,d adjacent to a shoulder of the flow seal peg 15f.

The sliding seal assembly 3s may move to the supply position as the downhole tool DTL consumes the mud 17 from the regulated portion of the body chamber, thereby decreasing the pressure to be less than the set point as a result. This decrease may cause the piston of the seal carrier 9 to experience a net fluid force to be exerted thereon to the right in FIG. 2A, thereby moving the seal carrier to the supply position. In the supply position, the guide of the seal carrier 9 may be engaged with an end of the guide receptacle of the body 5 and the large face of the mechanical supply seal peg 15f may be clear of the flow passage through the supply seal plate 7f, thereby allowing mud 17 from the drill string bore to replenish the regulated portion of the body chamber. The mud 17 may flow from the flow passage of the supply seal plate 7f, along the annular flow path of the regulated portion of the body chamber, and exit the regulated portion of the body chamber via the outlet ports of the body 5.

Also in the supply position, the flow passage of the vent seal plate 6f may be covered by a large face of the mechanical vent seal peg 13f. Higher pressure in the regulated portion of the body chamber than the lower annulus pressure in the passages of the vent seal plates 6e,f may operate the vent seal 10 to close the regulated portion of the body chamber from the passage of the vent seal plate 6f. The higher pressure may exert a net inward fluid force on the key seal 14k, thereby pressing the key seal against the pin of the flow seal peg 13f and allowing pressurization of the shoulder of the flow seal peg and the adjacent opposed face of the energization seal ring 13e while isolating the inner interface between the mechanical vent seals 13e,f. This pressurization may exert a net fluid force on the mechanical vent seals 13e,f, thereby pressing the mechanical vent seals against the respective vent seal plates 6e,f and closing the passage of the vent seal plate 6f from the regulated portion of the body bore.

Figure 3A:
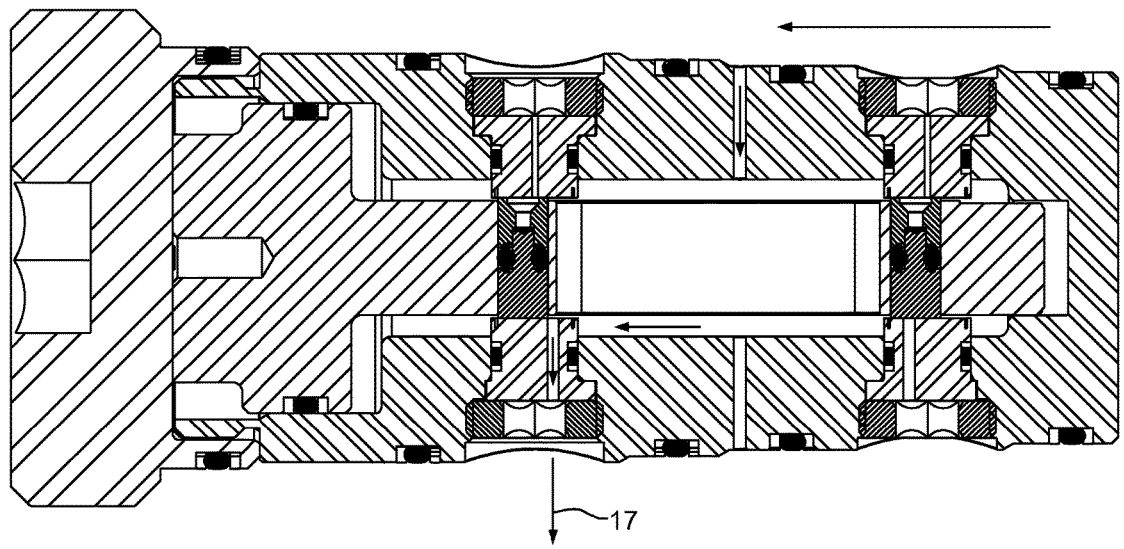
FIG. 3A illustrates the regulator in a vent position.
Figure 3B:
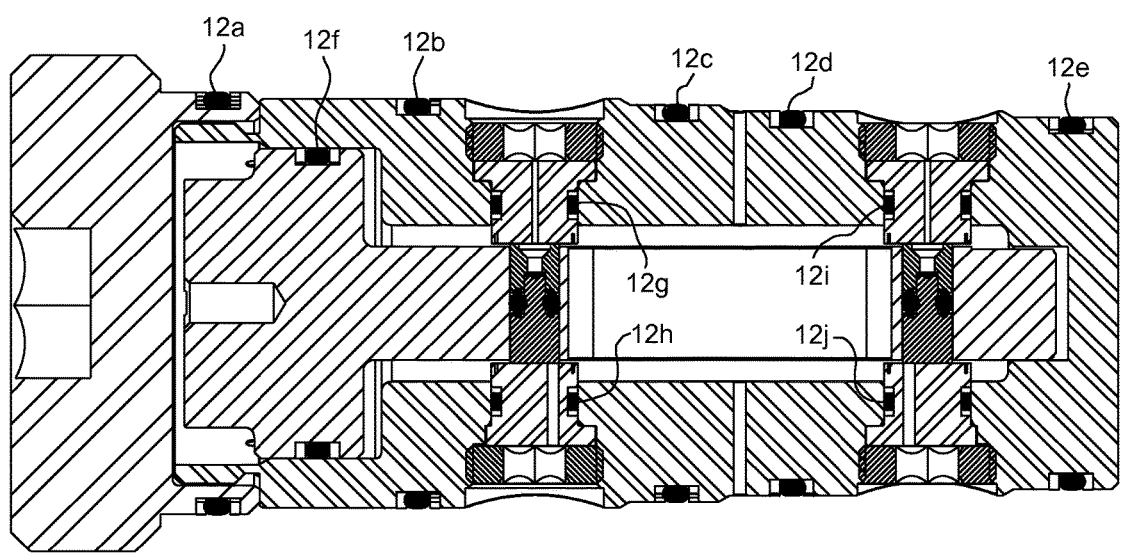
FIG. 3B illustrates the regulator in an equilibrium position.

FIG. 3A illustrates the regulator 1 in a vent position. The sliding seal assembly 3s may move to the vent position should pressure in the regulated portion of the body chamber become greater than the set point, such as by fluctuations in the drill string bore pressure. This imbalance may cause the piston of the seal carrier 9 to experience a net fluid force to be exerted thereon to the left in FIG. 3A, thereby moving the seal carrier to the vent position. In the vent position, the piston of the seal carrier 9 may be engaged with a face of the cap 4 and the large face of the mechanical vent seal peg 13f may be clear of the flow passage through the vent seal plate 6f, thereby allowing mud 17 from the downhole tool DTL and/or the regulated portion of the body chamber to flow therethrough.

Also in the vent position, the flow passage of the supply seal plate 7f may be covered by the large face of the supply seal peg 15f. Lower pressure in the regulated portion of the body chamber than the drill string bore pressure in the passages of the supply seal plates 7e,f may operate the supply seal 11 to close the regulated portion of the body chamber from the flow passage of the supply seal plate 7f. The higher pressure may exert a net outward fluid force on the key seal 16k, thereby pressing the key seal against the supply gland of the seal carrier 9 and allowing pressurization of the shoulder of the flow seal peg 15f and the adjacent opposed face of the energization seal ring 15e while isolating the outer interface between the mechanical supply seals 15e,f and the seal bore of the supply gland.

This pressurization may be counteracted by the drill string bore pressure exerted on the large face of the supply flow seal peg 15f and faces of the energizing supply ring 15e adjacent to the supply seal plate 7e. Since a portion of the large face of the peg 15f and a portion of the supply seal ring 15e are engaged with the respective supply seal plates 7e,f the exposed area of the counteracting portions is less than the exposed area of the engaging portions, thereby resulting in a net engagement force exerted by the drill string bore pressure on the mechanical supply seals 15e,f. This net engagement force may act in conjunction with the force of the spring-seal 16 to firmly press the mechanical supply seals 15e,f against the respective supply seal plates 7e,f, thereby closing the flow passage of the supply seal plate 7f from the regulated portion of the body bore.

FIG. 3B illustrates the regulator 1 in an equilibrium position. The sliding seal assembly 3s may move to the equilibrium position should pressure in the regulated portion of the body chamber become equal to the set point, such as after venting and/or before or after operation of the downhole tool DTL. In the equilibrium position, the large faces of the mechanical seal pegs 13f, 15f may cover the respective flow passages of the seal plates 6f, 7f, thereby closing the regulated portion of the body bore from both the flow passages.

Figure 4A:
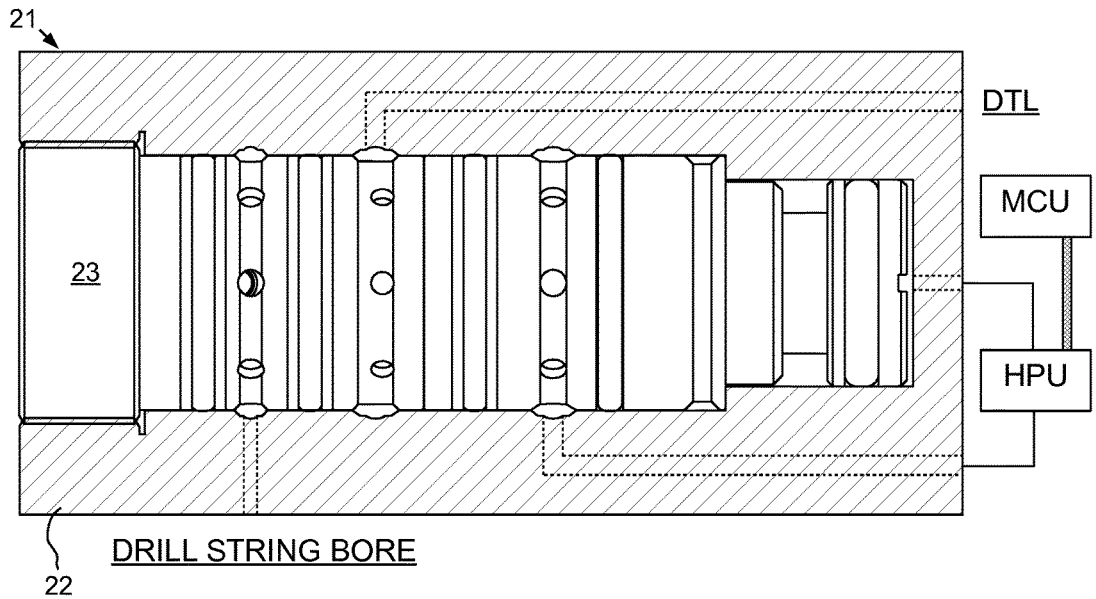
FIG. 4A illustrates a dirty fluid control valve, according to another embodiment of the present disclosure.
Figure 4B:
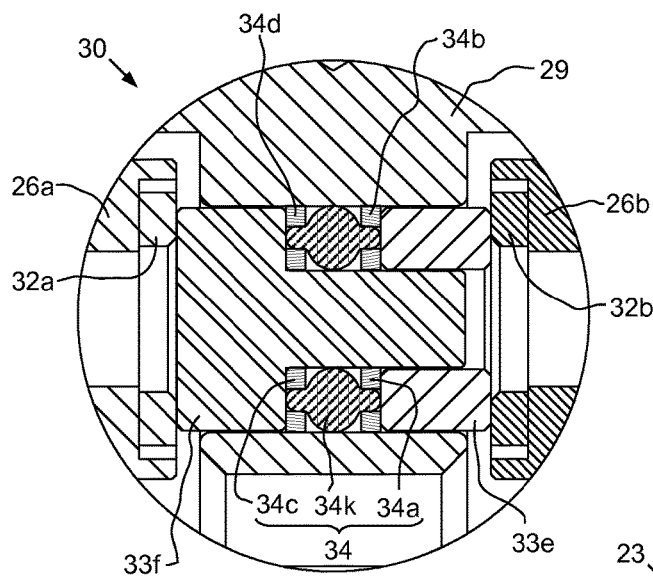
FIG. 4B is an enlargement of FIG. 5A.
Figure 4C:
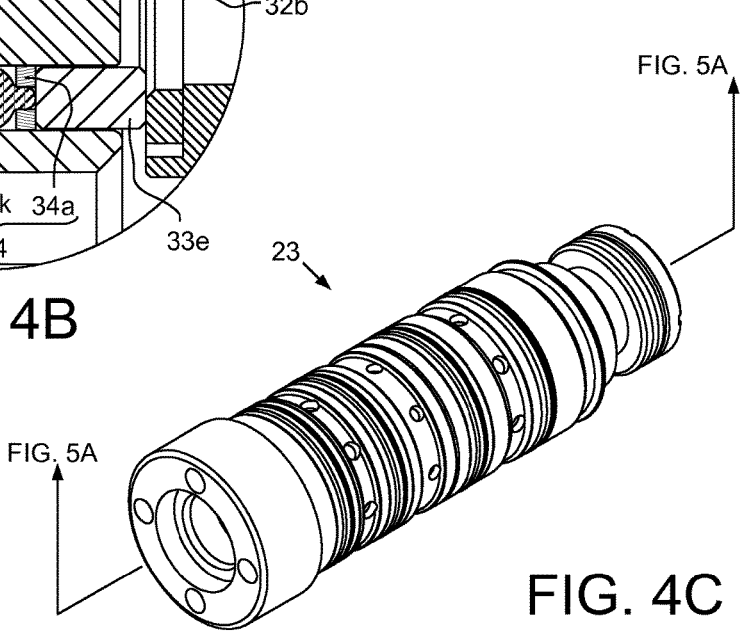
FIG. 4C illustrates a cartridge of the control valve.

FIG. 4A illustrates a dirty fluid control valve 21, according to another embodiment of the present disclosure. FIG. 4C illustrates a cartridge 23 of the control valve 21. Unless otherwise specified, parts, other than seals and backup rings, of the control valve 21 may each be made from a high strength metal or alloy, such as steel, stainless steel, nickel-chromium alloy, or cobalt-nickel-chromium alloy. Unless otherwise specified, seals may be made from an elastomer or elastomeric copolymer. Backup rings may be made from an engineering polymer.

The control valve 21 may include the cartridge 23 and a control sub 22 of a drill string for operating a downhole tool DTL of the drill string. The control sub 22 may be tubular and have a pocket formed in a wall thereof for receiving the cartridge 23. The cartridge 23 may be disposed in the pocket and connected to the control sub 22, such as by engagement of an outer threaded coupling of the cartridge 23 with an inner threaded coupling of the pocket. An outer shoulder of the cartridge 23 may also bear against a shoulder of the pocket. The control sub 22 may further have a microcontroller MCU and a hydraulic power unit HPU carried in the wall thereof and the hydraulic power unit may be in fluid communication with the cartridge 23 via opener and closer pilot passages formed in the wall between the hydraulic power unit and the pocket. The microcontroller MCU may be in communication with the hydraulic power unit HPU via lead wires or an electric cable. The control sub 22 may be located along the drill string adjacent to the downhole tool DTL and both may be part of a bottomhole assembly.

The control sub 22 may further have an inlet passage extending between the pocket and a bore formed therethrough for providing fluid communication between the cartridge 23 and a bore of the drill string. The control sub 22 may further have an outlet passage extending between the pocket and the downhole tool DTL for providing fluid communication between the cartridge 23 and the downhole tool.

Figures 5A, 5B:
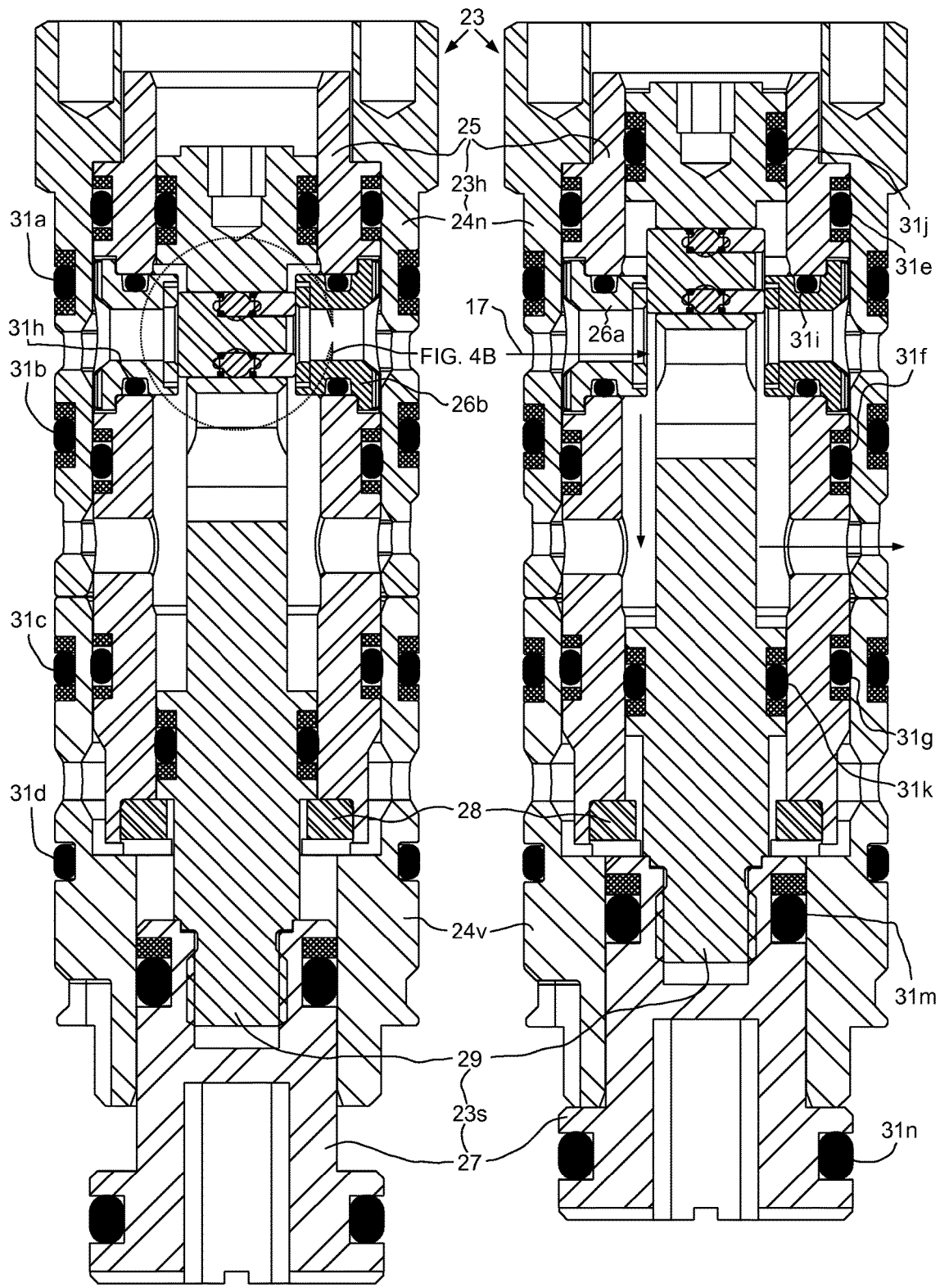
FIG. 5A is a cross section of FIG. 4C with the control valve in a closed position.
FIG. 5B illustrates the control valve in an open position.

FIG. 5A is a cross section of FIG. 4C with the control valve in a closed position. FIG. 4B is an enlargement of FIG. 5A. The cartridge 23 may include a housing 23h and a sliding seal assembly 23s longitudinally movable relative to the housing between an open position (FIG. 5B) and a closed position (shown). The housing 23h may include a nut 24n, a sleeve 24v, a body 25, a pair of seal plates 26a,b, and a stop, such as a ring 28. The sliding seal assembly 23s may include a piston 27, a carrier 29, and a seal 30.

The nut 24n may have the outer threaded coupling formed in an outer surface thereof at a portion distal from the sleeve 24v for connection of the cartridge 23 to the control sub 22. The nut 24n may also have indentations formed in a face thereof distal from the sleeve 24v. The nut 24n may also have a butt joint formed in an end thereof adjacent to the sleeve 24v for mating with a butt joint of the sleeve, thereby trapping the sleeve between the nut and the shoulder of the pocket. The nut 24n may also have one or more (pair shown) inlet ports formed radially through a wall thereof and providing fluid communication between the pocket and body 25. The nut 24n may also have one or more (pair shown) outlet ports formed radially through a wall thereof and providing fluid communication between the pocket and body 25. The nut 24n may also have a shoulder formed in an inner surface thereof for receiving the body 25.

The sleeve 24v may have the outer shoulder formed in an outer surface thereof at a portion distal from the nut 24n for engagement with the shoulder of the pocket. The sleeve 24v may also have a slot formed in the outer shoulder thereof. The sleeve 24v may also have the butt joint formed in the end thereof adjacent to the nut 24n for mating with the butt joint of the nut. The sleeve 24v may also have one or more (pair shown) closer ports formed radially through a wall thereof and providing fluid communication between the pocket and piston 27. The sleeve 24v may also have a shoulder formed in an inner surface thereof for receiving the body 25.

The body 25 may be tubular having a longitudinal bore formed therethrough. The body 25 may have a shoulder formed in an outer surface thereof for engagement with the shoulder of the nut 24n. The body 25 may be disposed in a bore formed through the sleeve 24v and the nut 24n and trapped therein between the shoulders thereof. The body 25 may have sockets formed radially through a wall thereof and providing fluid communication (via the inlet ports of the nut 24n) between the pocket and a valve chamber formed by a portion of the body bore between seal shoulders of the seal carrier 29. The body 25 may also have one or more (pair shown) outlet ports formed through the wall thereof and providing fluid communication (via the outlet ports of the nut 24n) between the pocket and the valve chamber. The body 25 may also have a receptacle formed in an end thereof adjacent to the sleeve 24v and the stop ring 28 may be disposed therein. The stop ring 28 may have face distal from the body 25 engaged with the sleeve shoulder. The stop ring 28 may have one or more (pair shown) grooves formed through a wall thereof and providing fluid communication (via the closer ports of the sleeve 24v) between the pocket and the piston 27.

The nut 24n may also have a seal groove formed in the outer surface of the portion between the outer threaded coupling thereof and the inlet ports thereof and a seal assembly 31a may be disposed therein for engagement with a side of the pocket. The seal assembly 31a may include a seal, such as an o-ring, and a pair of backup rings straddling the o-ring. The nut 24n may also have a seal groove formed in the outer surface thereof between the inlet and outlet ports thereof and a seal assembly 31b may be disposed therein for engagement with the side of the pocket. The seal assembly 31b may include a seal, such as an o-ring, and a pair of backup rings straddling the o-ring. The seal assemblies 31a,b may straddle the inlet ports of the nut 24n. The sleeve 24v may also have a seal groove formed in the outer surface thereof between the outlet ports of the nut 24n and the closer ports thereof and a seal assembly 31c may be disposed therein for engagement with the side of the pocket. The seal assembly 31c may include a seal, such as an o-ring, and a pair of backup rings straddling the o-ring. The seal assemblies 31b,c may straddle the outlet ports of the nut 24n. The sleeve 24v may also have a seal groove formed in the outer surface thereof between the closer ports thereof and the outer shoulder thereof and a seal 31d, such as an o-ring, may be disposed therein for engagement with the side of the pocket. The seal assembly 31c and the seal 31d may straddle the closer ports of the sleeve 24v.

The body 25 may also have a seal groove formed in the outer surface thereof between the shoulder thereof and the sockets thereof and a seal assembly 31e may be disposed therein for engagement with an inner surface of the nut 24n. The seal assembly 31e may include a seal, such as an o-ring, and a pair of backup rings straddling the o-ring. The body 25 may also have a seal groove formed in the outer surface thereof between the sockets thereof and the outlet ports thereof and a seal assembly 31f may be disposed therein for engagement with the inner surface of the nut 24n. The seal assembly 31f may include a seal, such as an o-ring, and a pair of backup rings straddling the o-ring. The seal assemblies 31e,f may straddle the sockets of the body 25. The body 25 may also have a seal groove formed in the outer surface thereof between the outlet ports thereof and the receptacle thereof and a seal assembly 31g may be disposed therein for engagement with the inner surface of the nut 24n. The seal assembly 31g may include a seal, such as an o-ring, and a pair of backup rings straddling the o-ring. The seal assemblies 31f,g may straddle the outlet ports of the body 25.

The seal plates 26a,b may each be a round plug having a flange and a stem extending from the flange. Each socket of the body 25 may have an outer lip, an inner seal bore, and a mid shoulder connecting the lip and seal bore. The seal plates 26a,b may have seal grooves formed in the stems thereof and seals 31h,i, such as o-rings, may be disposed therein for engagement with the seal bores of the respective sockets. Inner faces of the flanges of the seal plates 26a,b may mate with the shoulders of the respective sockets of the body 25. The seal plates 26a,b may be trapped between the sockets of the body and the inner surface of the nut 24n, thereby connecting the seal plates to the body 25. The stems of the seal plates 26a,b may extend past the body inner surface and protrude into the valve chamber of the body 25. Each seal plate 26a,b may have a central passage formed therethrough.

The seal plates 26a,b may also have grooves formed in ends thereof adjacent to the sliding seal 30 and inserts 32a,b may be disposed in the respective grooves allowing the seal plates 26a,b to be made one of the metals or alloys discussed above. The inserts 32a,b may be made from an abrasion resistant material, such as a cermet or ceramic. The cermet may be tungsten carbide and the ceramic may be synthetic corundum. The inserts 32a,b may be attached, such as brazed, to the respective seal plates 26a,b. The inserts 32a,b may each have a height corresponding to a height of the respective groove, such as being equal to or slightly greater than, such that the inserts are flush with the respective seal plates 26a,b or protrude from the grooves to engage the sliding seal 30. Each insert 32a,b may be cylindrical and have a central passage formed therethrough corresponding to the passage of the respective seal plate 26a,b.

Alternatively, the inserts 32a,b may be made from cubic boron nitride or synthetic diamond instead of the ceramic or cermet.

The seal carrier 29 may be a round shaft having an enlarged first seal shoulder disposed in the body bore adjacent to the nut 24n, a gland extending from the first seal shoulder into the valve chamber of the body 25, a sleeve extending from the gland along the valve chamber, an extender extending from the sleeve along the valve chamber, an enlarged second seal shoulder disposed in the body bore adjacent to the sleeve 24v, and a threaded coupling extending from the second seal shoulder and forming an end of the seal carrier. The seal carrier 29 may also have a torsional socket formed in a face thereof adjacent to the first seal shoulder. The seal shoulders of the seal carrier 29 may have seal grooves formed in outer surfaces thereof and seal assemblies 31j,k may be disposed therein for engagement with an inner surface of the body 25. Each seal assembly 31j,k may include a seal, such as an o-ring, and a pair of backup rings straddling the o-ring. The seal assemblies 31j,k may straddle the valve chamber of the body 25. An outer diameter of the gland, sleeve, and extender of the seal carrier 29 may be less or substantially less than an inner diameter of the valve chamber of the body 25, thereby defining an annular flow path therethrough.

The piston 27 may be round and have a stem disposed in a bore of the sleeve 24v and a flange extending from the stem to a location outside of the sleeve. The piston 27 may also have a threaded coupling formed in the stem and mated with the threaded coupling of the seal carrier 29, thereby fastening the two members together. The piston 27 may also have a torsional socket formed in a face thereof adjacent to the flange. The piston 27 may also have one or more (pair shown) grooves formed in the face thereof adjacent to the flange. The piston 27 may also have a seal groove formed in an outer surface of the stem and a seal assembly 31m may be disposed therein for engagement with the inner surface of the sleeve 24v. The seal assembly 31m may include a seal, such as an o-ring, and a backup ring engaged with the o-ring at an end of the seal groove adjacent to a face of the stem. The seal assemblies 31k,m may straddle a closing chamber of the valve 21. The piston 27 may also have a seal groove formed in an outer surface of the flange and a seal 31n, such as an o-ring, may be disposed therein for engagement with the side of the pocket. An opening chamber may be formed between the seal 31n and the closed end of the pocket.

The sliding seal 30 may extend through a seal bore of the carrier gland and include a pair of opposed mechanical seals 33e,f and a spring-seal 34 disposed between the mechanical seals. Each mechanical seal 33e,f may be made from an abrasion resistant material, such as a cermet. The cermet may be tungsten carbide. An energization mechanical seal 33e may be a ring and a flow mechanical seal 33f may be a round peg. The flow seal peg 33f may have a larger disk adjacent to the seal insert 32a, a smaller pin adjacent to the energization seal ring 33e, and a shoulder connecting the pin and disk. A bore of the mechanical seal ring 33e may receive an end of the pin of the flow seal peg 33f. An outer diameter of the sliding seal 30 may correspond to, such as being slightly greater than, a stroke of the sliding seal assembly 23s between the open and closed positions such that at least a portion the mechanical seals 33e,f are engaged with the respective inserts 32a,b at and between the open and closed positions.

Alternatively, one or both of the mechanical seals 33e,f may be modified to have grooves and inserts.

The spring-seal 34 may include a key seal 34k, a pair of backup rings 34a,b adjacent to a face of the energization seal ring 33e, and a pair backup rings 34c,d adjacent to the shoulder of the flow seal peg 33f. Each pair of backup rings 34a-d may straddle respective portions of the key seal 34k. The spring-seal 34 may be disposed between and have ends pressing against the opposing face and shoulder of the mechanical seals 33e,f, thereby operating as a compression spring biasing the mechanical supply seals away from each other and into engagement with the respective inserts 32a,b. The key seal 34k may be in engagement with the seal bore of the carrier gland and the pin of the flow seal peg 33f, thereby selectively isolating an inner interface between the mechanical seals 33e,f and selectively isolating an outer interface between the mechanical seals and the seal bore of the carrier gland.

The key seal 34k may be a ring having a composite shaped cross section. The cross section may have a mid circular seal portion, a first lobe extending from the mid seal portion to the adjacent face of the energization seal ring 33e, and a second lobe extending from the mid seal portion to the shoulder of the flow seal peg 33f. The lobes may be aligned with the mid portion. A thickness of the mid portion may be greater or substantially greater than, such as three-halves or twice, the thickness of each lobe. Each lobe may have a rectangular portion connecting to the seal portion and a rounded end distal from the seal portion. Each pair of backup rings 34a-d may straddle the respective lobe.

The sliding seal assembly 23s may move to the closed position in response to injection of hydraulic fluid into the closing chamber by the hydraulic power unit HPU while allowing the hydraulic fluid in the opener chamber to freely flow to a reservoir thereof. This injection of hydraulic fluid may exert a net fluid force on the piston 27 (downward in FIG. 5A), thereby moving the sliding seal assembly 23s to the closed position. In the closed position, the second seal shoulder of seal carrier 29 may be engaged with the stop ring 28, the passage of the insert 32a may be covered by a large face of the mechanical seal peg 33f, and the passage of the insert 32b may be straddled by the mechanical seal ring 33e. The sliding seal 30 may be bidirectional for closing the passages of the seal plates 26a,b from the valve chamber of the body 25 regardless of whether the drill string bore pressure is greater than, equal to, or less than pressure in the valve chamber.

If pressure in the valve chamber is greater than the drill string bore pressure, the higher pressure may exert a net inward fluid force on the key seal 34k, thereby pressing the key seal against the pin of the flow seal peg 33f and allowing pressurization of the shoulder of the flow seal peg and the adjacent opposed face of the energization seal ring 33e while isolating the inner interface between the mechanical seals 33e,f. This pressurization may exert a net fluid force on the mechanical seals 33e,f, thereby pressing the mechanical seals against the respective inserts 32a,b for closure of the passages of the seal plates 26a,b from the valve chamber of the body 25.

If pressure in the valve chamber is less than the drill string bore pressure, the higher pressure in the passages of the seal plates 26a,b may exert a net outward fluid force on the key seal 34k, thereby pressing the key seal against the gland of the seal carrier 29 and allowing pressurization of the shoulder of the flow seal peg 33f and the adjacent opposed face of the energization seal ring 33e while isolating the outer interface between the mechanical seals 33e,f and the seal bore of the carrier gland. This pressurization may be counteracted by the drill string bore pressure exerted on the large face of the supply flow seal peg 33f and faces of the energizing supply ring 33e adjacent to the seal plate 26b. Since a portion of the large face of the peg 33f and a portion of the seal ring 33e are engaged with the respective inserts 32a,b, the exposed area of the counteracting portions is less than the exposed area of the engaging portions, thereby resulting in a net engagement force exerted by the drill string bore pressure on the mechanical seals 33e,f. This net engagement force may act in conjunction with the force of the spring-seal 34 to firmly press the mechanical supply seals 33e,f against the respective inserts 32a,b, thereby closing the passages of the seal plates 26a,b from the valve chamber of the body 25.

FIG. 5B illustrates the control valve 21 in an open position. The sliding seal assembly 23s may move to the open position in response to injection of hydraulic fluid into the opening chamber by the hydraulic power unit HPU while allowing the hydraulic fluid in the closer chamber to freely flow to the reservoir thereof. This injection of hydraulic fluid may exert a net fluid force on the piston 27 (upward in FIG. 5B), thereby moving the sliding seal assembly 23s to the open position. In the open position, the flange of the piston 27 may be engaged with the sleeve 24v and the sliding seal 30 may be clear of the flow passages through the seal plates 26a,b and inserts 32a,b, thereby allowing mud 17 from the drill string bore to flow to the downhole tool DTL via the inlet ports of the nut 24n, the passages of the seal plates and inserts, the annular flow path of the valve chamber, the outlet ports of the body 25, and the outlet ports of the nut 24n.

Figure 6A:
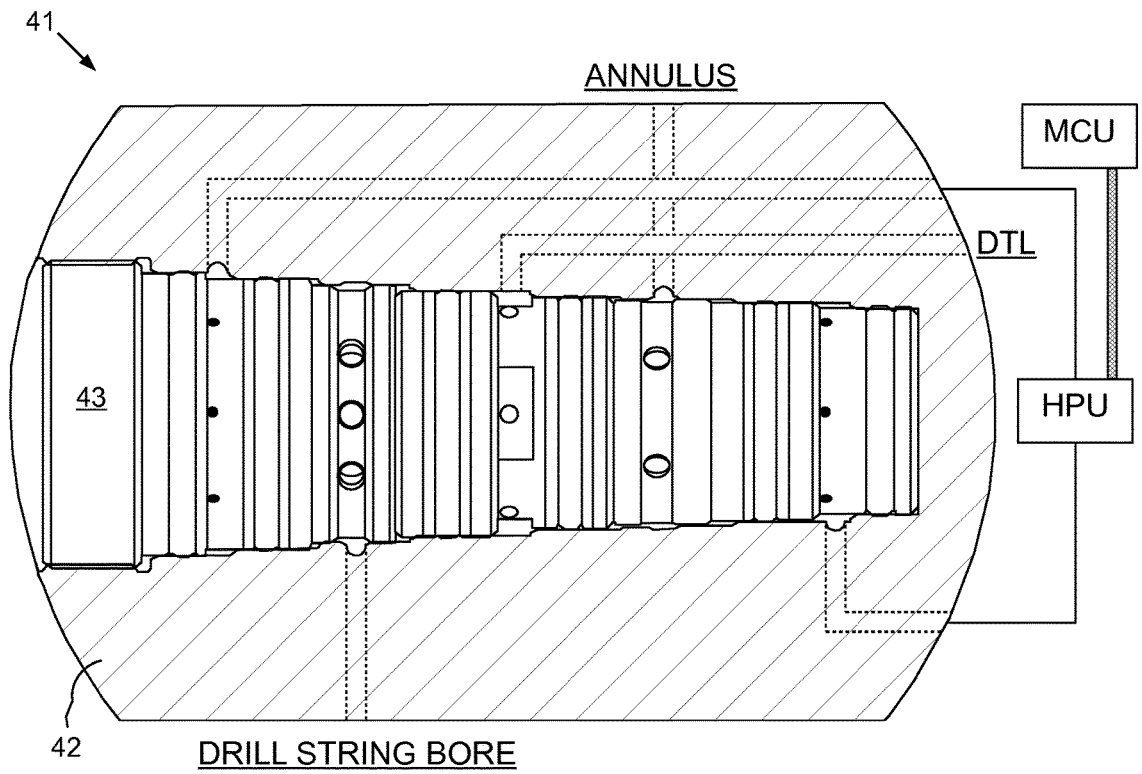
FIG. 6A illustrates a second dirty fluid control valve, according to another embodiment of the present disclosure.
Figure 6B:
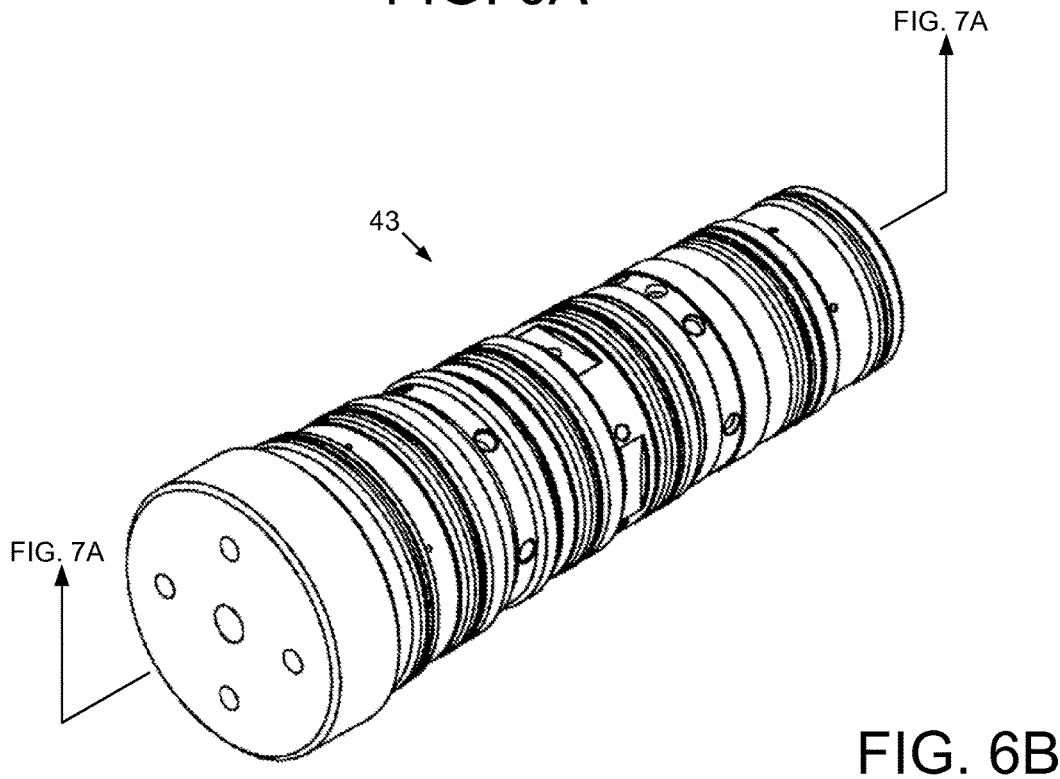
FIG. 6B illustrates a cartridge of the second control valve.

FIG. 6A illustrates a second dirty fluid control valve 41, according to another embodiment of the present disclosure. FIG. 6B illustrates a cartridge 43 of the second control valve. Unless otherwise specified, parts, other than seals and backup rings, of the control valve 41 may each be made from a high strength metal or alloy, such as steel, stainless steel, nickel-chromium alloy, or cobalt-nickel-chromium alloy. Unless otherwise specified, seals may be made from an elastomer or elastomeric copolymer. Backup rings may be made from an engineering polymer.

The control valve 41 may include the cartridge 43 and a control sub 42 of a drill string for operating a downhole tool DTL of the drill string. The control sub 42 may be tubular and have a pocket formed in a wall thereof for receiving the cartridge 43. The cartridge 43 may be disposed in the pocket and connected to the control sub 42, such as by engagement of an outer threaded couplings of the cartridge 43 with respective inner threaded couplings of the pocket. An end of the cartridge 43 may also bear against a closed end of the pocket. The control sub 42 may further have a microcontroller MCU and a hydraulic power unit HPU carried in the wall thereof and the hydraulic power unit may be in fluid communication with the cartridge 43 via pilot passages formed in the wall between the hydraulic power unit and the pocket. The microcontroller MCU may be in communication with the hydraulic power unit HPU via lead wires or an electric cable. The control sub 42 may be located along the drill string adjacent to the downhole tool DTL and both may be part of a bottomhole assembly.

The control sub 42 may further have a vent passage extending between the pocket and an exterior thereof for providing fluid communication between the cartridge 43 and an annulus formed between the drill string and a wellbore (not shown). The control sub 42 may further have an inlet passage extending between the pocket and a bore formed therethrough for providing fluid communication between the cartridge 43 and a bore of the drill string. The control sub 42 may further have an outlet passage extending between the pocket and the downhole tool DTL for providing fluid communication between the cartridge 43 and the downhole tool.

Figures 7A, 7B:
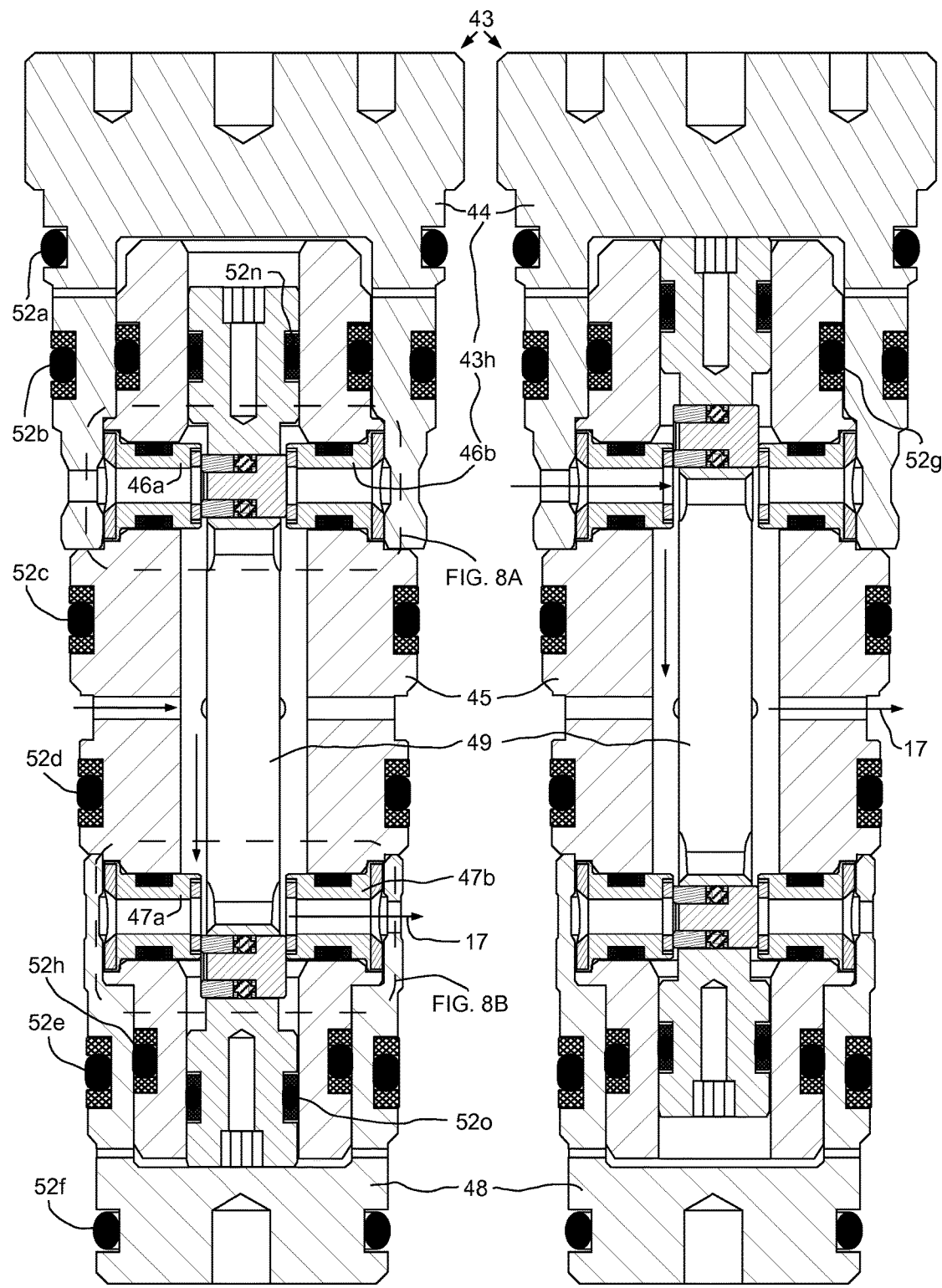
FIG. 7A is a cross section of FIG. 6B with the second control valve in a vent position.
FIG. 7B illustrates the second control valve in a supply position.
Figure 8A:
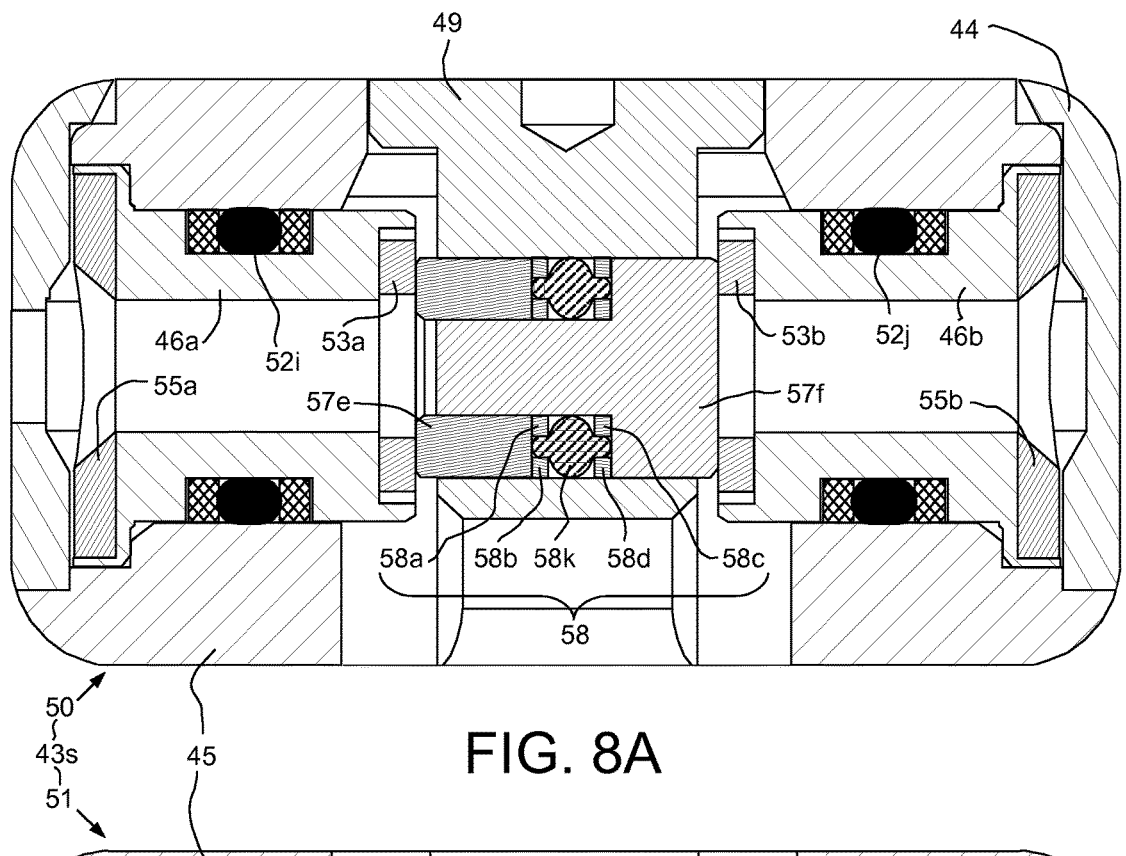
FIGS. 8A and 8B are enlargements of FIG. 7A.
Figure 8B:
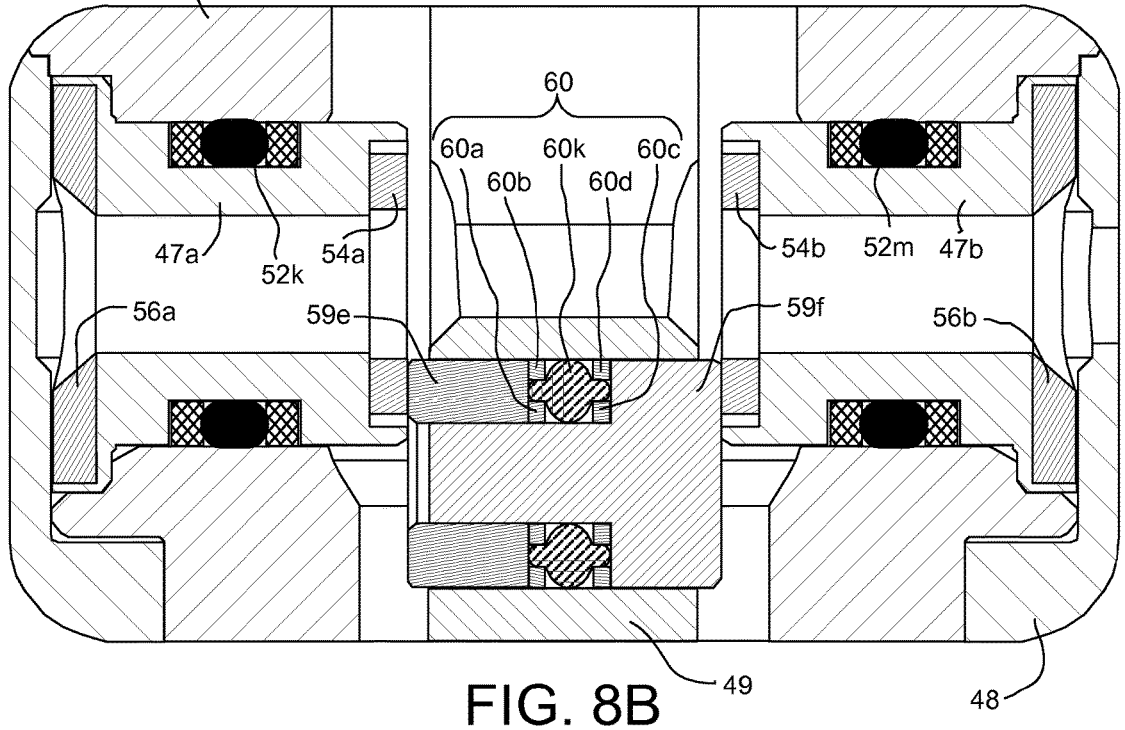

FIG. 7A is a cross section of FIG. 6B with the second control valve in a vent position. FIGS. 8A and 8B are enlargements of FIG. 7A. The cartridge 43 may include a housing 43h and a sliding seal assembly 43s longitudinally movable relative to the housing between a supply position (FIG. 7B) and a vent position (shown). The housing 43h may include a supply nut 44, a vent nut 48, a body 45, a pair of supply seal plates 46a,b, and pair of vent seal plates 47a,b. The sliding seal assembly 43s may include a carrier 49, a supply seal 50, and a vent seal 51.

The supply nut 44 may have a closed end and one of the outer threaded couplings formed in an outer surface thereof adjacent to the closed end thereof for connection of the cartridge 43 to the control sub 42. The supply nut 44 may also have indentations formed in a face thereof distal from the body 45. The supply nut 44 may also have a butt joint formed in an end thereof adjacent to the body 45 for mating with a shoulder of the body. The supply nut 44 may also have one or more (pair shown) pilot ports formed radially through a wall thereof and providing fluid communication between the pocket and the seal carrier 49. The supply nut 44 may also have a supply port formed radially through a wall thereof and providing fluid communication between the pocket and body 45. The supply nut 44 may also have a cavity formed therein for receiving an end of the body.

The vent nut 48 may have a closed end and one of the outer threaded couplings formed in an outer surface thereof adjacent to the closed end thereof for connection of the cartridge 43 to the control sub 42. The vent nut 48 may also have an indentation formed in a face thereof distal from the body 45. The vent nut 48 may also have a butt joint formed in an end thereof adjacent to the body 45 for mating with a shoulder of the body. The vent nut 48 may also have one or more (pair shown) pilot ports formed radially through a wall thereof and providing fluid communication between the pocket and the seal carrier 49. The vent nut 48 may also have a vent port formed radially through a wall thereof and providing fluid communication between the pocket and body 45. The vent nut 48 may also have a cavity formed therein for receiving an end of the body.

The body 45 may be tubular having a longitudinal bore formed therethrough. The body 45 may have shoulders engaged with the respective butt joints of the vent 48 and supply 44 nuts, thereby trapping the body therebetween. The body 45 may also have supply sockets formed radially through a wall thereof and providing fluid communication (via the supply port of the supply nut 44) between the pocket and a valve chamber formed by a portion of the body bore between pistons of the seal carrier 49. The body 45 may also have vent sockets formed radially through a wall thereof and providing fluid communication (via the vent port of the vent nut 48) between the pocket and the valve chamber thereof. The body 45 may also have one or more (pair shown) function ports formed through the wall thereof between the supply and vent sockets thereof and providing fluid communication between the pocket and the valve chamber.

The supply nut 44 may also have a seal groove formed in the outer surface of the portion between the outer threaded coupling thereof and the pilot ports thereof and a seal 52a, such as an o-ring, may be disposed therein for engagement with a side of the pocket. The supply nut 44 may also have a seal groove formed in the outer surface thereof between the pilot and supply ports thereof and a seal assembly 52b may be disposed therein for engagement with the side of the pocket. The seal assembly 52b may include a seal, such as an o-ring, and a pair of backup rings straddling the o-ring. The seal 52a and seal assembly 52b may straddle the pilot ports of the supply nut 44.

The body 45 may also have a seal groove formed in the outer surface thereof between the supply ports of the supply nut 44 and the function ports thereof and a seal assembly 52c may be disposed therein for engagement with the side of the pocket. The seal assembly 52c may include a seal, such as an o-ring, and a pair of backup rings straddling the o-ring. The seal assemblies 52b,c may straddle the supply ports of the supply nut 44. The body 45 may also have a seal groove formed in the outer surface thereof between the function ports thereof and the vent ports of the vent nut 48 and a seal assembly 52d may be disposed therein for engagement with the side of the pocket. The seal assembly 52d may include a seal, such as an o-ring, and a pair of backup rings straddling the o-ring. The seal assemblies 52c,d may straddle the function ports of the body 45.

The vent nut 48 may also have a seal groove formed in the outer surface thereof between the pilot and supply ports thereof and a seal assembly 52e may be disposed therein for engagement with the side of the pocket. The seal assembly 52e may include a seal, such as an o-ring, and a pair of backup rings straddling the o-ring. The seal assemblies 52d,e may straddle the vent ports of the vent nut 48. The vent nut 48 may also have a seal groove formed in the outer surface of the portion between the outer threaded coupling thereof and the pilot ports thereof and a seal 52f, such as an o-ring, may be disposed therein for engagement with a side of the pocket. The seal 52f and seal assembly 52e may straddle the pilot ports of the vent nut 48.

The body 45 may also have a seal groove formed in the outer surface thereof between the pilot ports of the supply nut 44 and the supply sockets thereof and a seal assembly 52g may be disposed therein for engagement with an inner surface of the supply nut. The seal assembly 52g may include a seal, such as an o-ring, and a pair of backup rings straddling the o-ring. The body 45 may also have a seal groove formed in the outer surface thereof between the vent sockets thereof and the pilot ports of the vent nut 48 and a seal assembly 52h may be disposed therein for engagement with an inner surface of the vent nut. The seal assembly 52h may include a seal, such as an o-ring, and a pair of backup rings straddling the o-ring.

Each of the supply 46a,b and vent 47a,b seal plates may be a round plug having a flange and a stem extending from the flange. Each socket of the body 45 may have an outer lip, an inner seal bore, and a mid shoulder connecting the lip and seal bore. The seal plates 46a,b, 47a,b may have seal grooves formed in the stems thereof and seal assemblies 52i-k,m may be disposed therein for engagement with the seal bores of the respective sockets. The seal assemblies 52i-k,m may each include a seal, such as an o-ring, and a pair of backup rings straddling the o-ring. Inner faces of the flanges of the seal plates 46a,b 47a,b may mate with the shoulders of the respective sockets of the body 45. The supply seal plates 46a,b, may be trapped between the sockets of the body 45 and the inner surface of the supply nut 44, thereby connecting the seal plates to the body. The vent seal plates 47a,b, may be trapped between the sockets of the body 45 and the inner surface of the vent nut 44, thereby connecting the seal plates to the body. The stems of the seal plates 46a,b, 47a,b may extend past the body inner surface and protrude into the valve chamber of the body 45. Each seal plate 46a,b, 47a,b may have a central passage formed therethrough.

The seal plates 46a,b, 47a,b may also have grooves formed in ends thereof adjacent to the respective sliding seals 50, 51 and seal inserts 53a,b, 54a,b may be disposed in the respective grooves allowing the seal plates 46a,b, 47a,b to be made one of the metals or alloys discussed above. The seal inserts 53a,b, 54a,b may be made from an abrasion resistant material, such as a cermet or ceramic. The cermet may be tungsten carbide and the ceramic may be synthetic corundum. The seal inserts 53a,b, 54a,b may be attached, such as brazed, to the respective seal plates 46a,b, 47a,b. The seal inserts 53a,b, 54a,b may each have a height corresponding to a height of the respective groove, such as being equal to or slightly greater than, such that the seal inserts are flush with the respective seal plates 46a,b, 47a,b or protrude from the grooves to engage the respective sliding seals 50, 51. Each seal insert 53a,b, 54a,b may be cylindrical and have a central passage formed therethrough corresponding to the passage of the respective seal plate 46a,b, 47a,b.

The seal plates 46a,b, 47a,b may also have grooves formed in ends thereof adjacent to the respective nuts 44, 48 and flow inserts 55a,b, 56a,b may be disposed in the respective grooves. The flow inserts 55a,b, 56a,b may be made from an erosion resistant material, such as a cermet or ceramic. The cermet may be tungsten carbide and the ceramic may be synthetic corundum. The flow inserts 55a,b, 56a,b may be attached, such as brazed, to the respective seal plates 46a,b, 47a,b. The flow inserts 55a,b, 56a,b may each have a height corresponding to a height of the respective groove, such as being equal to, such that the seal inserts are flush with the respective seal plates 46a,b, 47a,b. Each flow inserts 55a,b, 56a,b may be cylindrical and have a central passage formed therethrough corresponding to the passage of the respective seal plate 46a,b, 47a,b.

Alternatively, the inserts 53a,b, 54a,b, 55a,b, 56a,b may be made from cubic boron nitride or synthetic diamond instead of the ceramic or cermet.

The seal carrier 49 may be a round shaft having an enlarged first piston disposed in the body bore adjacent to the supply nut 44, a supply gland extending from the first piston into the valve chamber of the body 45, a vent gland disposed in the valve chamber, a sleeve connecting the supply and vent glands, an enlarged second piston disposed in the body bore adjacent to the vent nut 48. The seal carrier 49 may also have a torsional socket formed in each end face thereof. The pistons of the seal carrier 49 may have seal grooves formed in outer surfaces thereof and seal assemblies 52n,o may be disposed therein for engagement with an inner surface of the body 45. Each seal assembly 52n,o may include a seal, such as an o-ring, and a pair of backup rings straddling the o-ring. The seal assemblies 52n,o may straddle the valve chamber of the body 45. An outer diameter of the glands and sleeve of the seal carrier 49 may be less or substantially less than an inner diameter of the valve chamber of the body 45, thereby defining an annular flow path therethrough.

The sliding supply seal 50 may extend through a seal bore of the carrier supply gland and include a pair of opposed mechanical seals 57e,f and a spring-seal 58 disposed between the mechanical seals. The vent supply seal 51 may extend through a seal bore of the carrier vent gland and include a pair of opposed mechanical seals 59e,f and a spring-seal 60 disposed between the mechanical seals. Each mechanical seal 57e,f, 59e,f may be made from an abrasion resistant material, such as a cermet. The cermet may be tungsten carbide. Each energization mechanical seal 57e, 59e may be a ring and each flow mechanical seal 57f, 59f may be a round peg. The flow seal pegs 57f, 59f may each have a larger disk adjacent to the respective seal insert 53b, 54b, a smaller pin adjacent to the respective energization seal ring 57e, 59e, and a shoulder connecting the pin and disk. A bore of each mechanical seal ring 57e, 59e may receive an end of the pin of the respective flow seal peg 57f, 59f. An outer diameter of each sliding seal 50, 51 may correspond to, such as being slightly greater than, a stroke of the sliding seal assembly 43s between the supply and vent positions such that at least a portion the mechanical seals 57e,f, 59e,f are engaged with the respective seal inserts 53a,b, 54a,b at and between the supply and vent positions.

Alternatively, one or both of the supply mechanical seals 57e,f, and/or one or both of the vent mechanical seals 59e,f may be modified to have grooves and seal inserts.

The supply spring-seal 58 may include a key seal 58k, a pair of backup rings 58a,b adjacent to a face of the energization seal ring 57e, and a pair backup rings 58c,d adjacent to the shoulder of the flow seal peg 57f. The vent spring-seal 60 may include a key seal 60k, a pair of backup rings 60a,b adjacent to a face of the energization seal ring 59e, and a pair backup rings 60c,d adjacent to the shoulder of the flow seal peg 59f. Each spring seal 58, 60 may function in an identical fashion to the spring-seal 34.

The sliding seal assembly 43s may move to the vent position in response to injection of hydraulic fluid into pilot ports of the supply nut 44 by the hydraulic power unit HPU while allowing the hydraulic fluid from the pilot ports of the vent nut 48 to freely flow to a reservoir thereof. This injection of hydraulic fluid may exert a net fluid force on the first piston of the seal carrier 49 (downward in FIG. 7A), thereby moving the sliding seal assembly 43s to the vent position.

In the vent position, the second piston of seal carrier 49 may be engaged with the vent nut 48, the passage of the supply seal insert 53b may be covered by a large face of the supply mechanical seal peg 57f, and the passage of the supply seal insert 53a may be straddled by the supply mechanical seal ring 57e. The supply sliding seal 50 may close the passages of the supply seal plates 46a,b from the valve chamber of the body 45 in a similar fashion to the sliding seal 30.

Also in the vent position, the sliding vent seal 51 may be clear of the flow passages through the vent seal plates 47a,b, thereby allowing mud 17 from the downhole tool DTL to flow to the annulus via the function ports of the body 45, the annular flow path of the valve chamber, the passages of the vent seal plates and inserts 54a,b, 56a,b, and the vent ports of the vent nut 48.

FIG. 7B illustrates the second control valve 41 in a supply position. The sliding seal assembly 43s may move to the supply position in response to injection of hydraulic fluid into pilot ports of the vent nut 48 by the hydraulic power unit HPU while allowing the hydraulic fluid from the pilot ports of the supply nut 44 to freely flow to the reservoir thereof. This injection of hydraulic fluid may exert a net fluid force on the second piston of the seal carrier 49 (upward in FIG. 7B), thereby moving the sliding seal assembly 43s to the supply position.

In the supply position, the first piston of seal carrier 49 may be engaged with the supply nut 44, the passage of the vent seal insert 54b may be covered by a large face of the vent mechanical seal peg 59f, and the passage of the vent seal insert 54a may be straddled by the vent mechanical seal ring 59e. The vent sliding seal 51 may close the passages of the vent seal plates 47a,b from the valve chamber of the body 45 in a similar fashion to the sliding seal 30.

Also in the supply position, the sliding supply seal 50 may be clear of the flow passages through the supply seal plates 46a,b, thereby allowing mud 17 from the drill string bore to flow to the downhole tool DTL via the supply ports of the supply nut 44, the passages of the supply seal plates and inserts 53a,b, 55a,b, the annular flow path of the valve chamber, and the function ports of the body 45.

Figure 9A:
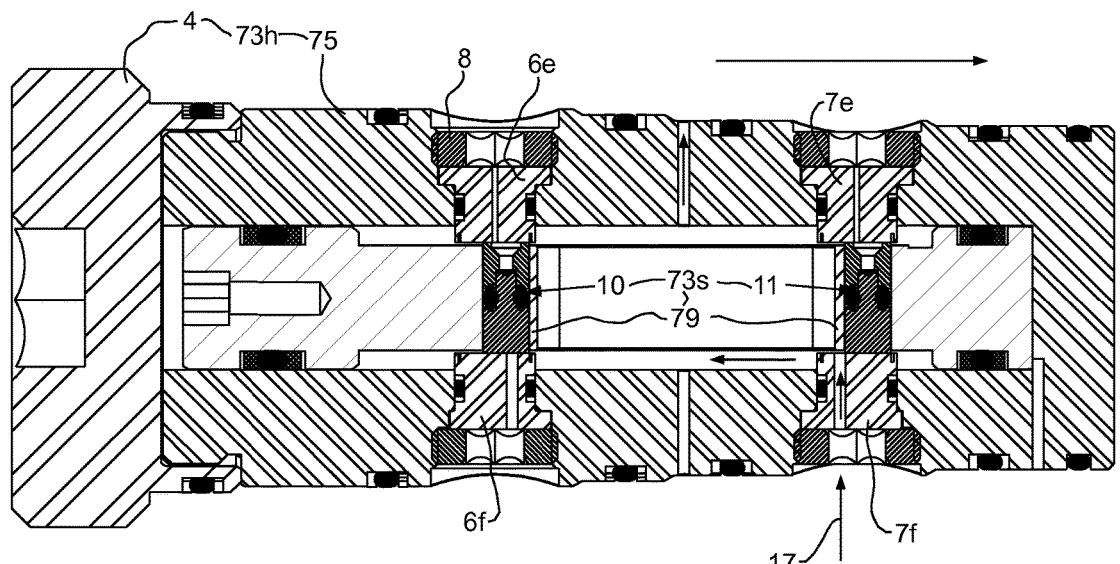
FIG. 9A illustrates a cartridge of a third dirty fluid control valve in a supply position, according to another embodiment of the present disclosure.

FIG. 9A illustrates a cartridge 73 of a third dirty fluid control valve in a supply position, according to another embodiment of the present disclosure. Unless otherwise specified, parts, other than seals and backup rings, of the third control valve may each be made from a high strength metal or alloy, such as steel, stainless steel, nickel-chromium alloy, or cobalt-nickel-chromium alloy. Unless otherwise specified, seals may be made from an elastomer or elastomeric copolymer. Backup rings may be made from an engineering polymer.

The third control valve may include the cartridge 73 and a control sub (not shown) of a drill string for operating a downhole tool (not shown) of the drill string. The control sub may be tubular and have a pocket formed in a wall thereof for receiving the cartridge 73. The cartridge 73 may be disposed in the pocket and connected to the control sub, such as by engagement of an outer threaded coupling of the cartridge 43 with an inner threaded coupling of the pocket. An end of the cartridge 73 may also bear against a closed end of the pocket. The control sub may further have a microcontroller and a hydraulic power unit carried in the wall thereof and the hydraulic power unit may be in fluid communication with the cartridge 73 via pilot passages formed in the wall between the hydraulic power unit and the pocket. The microcontroller may be in communication with the hydraulic power unit via lead wires or an electric cable. The control sub may be located along the drill string adjacent to the downhole tool and both may be part of a bottomhole assembly.

The control sub may further have a vent passage extending between the pocket and an exterior thereof for providing fluid communication between the cartridge 73 and an annulus formed between the drill string and a wellbore (not shown). The control sub may further have an inlet passage extending between the pocket and a bore formed therethrough for providing fluid communication between the cartridge 73 and a bore of the drill string. The control sub may further have an outlet passage extending between the pocket and the downhole tool for providing fluid communication between the cartridge 73 and the downhole tool.

Figure 9B:
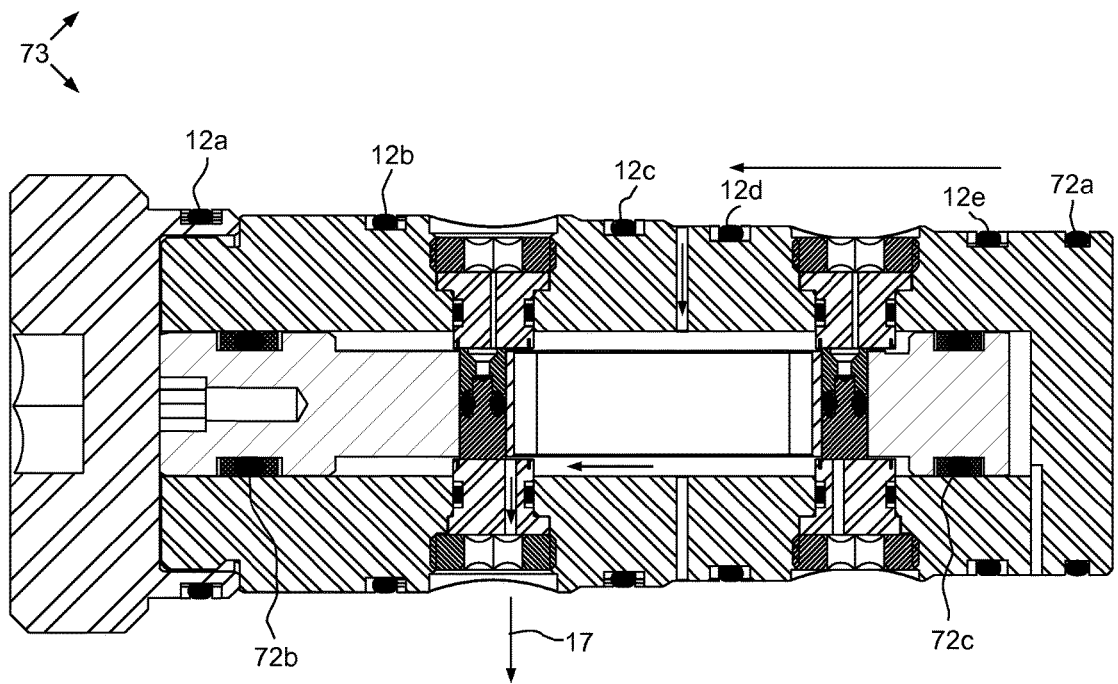
FIG. 9B illustrates the third control valve in a vent position.

The cartridge 73 may include a housing 73h and a sliding seal assembly 73s longitudinally movable relative to the housing between a supply position (shown) and a vent position (FIG. 9B). The housing 73h may include the cap 4, a body 75, the pair of the vent seal plates 6e,f, the pair of the supply seal plates 7e,f, and the retainer, such as the nut 8, for each of the seal plates. The sliding seal assembly 73s may include a carrier 79, the vent seal 10, and the supply seal 11.

The body 75 may be tubular having a longitudinal bore formed therethrough, a closed end, and an open end. The body 75 may have vent sockets formed radially through a wall thereof and providing fluid communication between the pocket and a valve chamber formed by a portion of the body bore between pistons of the seal carrier 79. The body 75 may also have supply sockets formed radially through the wall thereof and providing fluid communication between the pocket and the valve chamber. The body 75 may also have a first pilot port (not shown) formed through the wall thereof and a second pilot port formed through a wall thereof, each pilot port providing fluid communication between the pocket and the respective piston of the seal carrier 79. The body 75 may also have one or more (pair shown) function ports formed through the wall thereof and providing fluid communication between the pocket and the valve chamber. The body 75 may also have a lap joint formed in an outer surface thereof adjacent to the open end thereof for mating with the lap joint of the cap 4, thereby trapping the body between the cap and the closed end of the pocket.

Similar to the body 5 of the regulator 1, the body 75 may have seal grooves for receiving the seal assemblies 12b-e. The body 75 may also have a seal groove formed in the outer surface thereof between the second pilot port and the closed lower end thereof and a seal 72a, such as an o-ring, (numbered in FIG. 9B) may be disposed therein for engagement with the side of the pocket. The seal 72a and seal assembly 12e may straddle the second pilot port of the body 75.

The seal carrier 79 may be a round shaft having an enlarged first piston disposed in the body bore adjacent to the cap 4, a vent gland extending from the first piston into the valve chamber of the body 75, a supply gland disposed in the valve chamber, a sleeve connecting the supply and vent glands, an enlarged second piston disposed in the body bore adjacent to the closed end of the body. The seal carrier 79 may also have a torsional socket formed in an end face adjacent to the first piston. The pistons of the seal carrier 79 may have seal grooves formed in outer surfaces thereof and seal assemblies 72b,c (numbered in FIG. 9B) may be disposed therein for engagement with an inner surface of the body 75. Each seal assembly 72b,c may include a seal, such as an o-ring, and a pair of backup rings straddling the o-ring. The seal assemblies 72b,c may straddle the valve chamber of the body 75. An outer diameter of the glands and sleeve of the seal carrier 79 may be less or substantially less than an inner diameter of the valve chamber of the body 75, thereby defining an annular flow path therethrough.

The sliding seal assembly 73s may move to the supply position in response to injection of hydraulic fluid into the first pilot port of the body 75 by the hydraulic power unit while allowing the hydraulic fluid from the second pilot port of the body to freely flow to a reservoir thereof. This injection of hydraulic fluid may exert a net fluid force on the first piston of the seal carrier 79 (rightward in FIG. 9A), thereby moving the sliding seal assembly 73s to the supply position.

In the supply position, the second piston of seal carrier 79 may be engaged with the closed lower end of the body 75 and the vent sliding seal 10 may close the passages of the vent seal plates 6e,f from the valve chamber of the body 75 as discussed above for the regulator 1. Also in the supply position, the sliding supply seal 11 may be clear of the flow passage through the supply seal plate 7f, thereby allowing mud 17 from the drill string bore to flow to the downhole tool via the passage of the supply seal plate, the annular flow path of the valve chamber, and the function ports of the body 75.

FIG. 9B illustrates the third control valve in a vent position. The sliding seal assembly 73s may move to the vent position in response to injection of hydraulic fluid into the second pilot port of the body 75 by the hydraulic power unit while allowing the hydraulic fluid from the first pilot port of the body to freely flow to the reservoir thereof. This injection of hydraulic fluid may exert a net fluid force on the second piston of the seal carrier 79 (leftward in FIG. 9B), thereby moving the sliding seal assembly 73s to the vent position.

In the vent position, the first piston of seal carrier 79 may be engaged with the cap 4 and the supply sliding seal 11 may close the passages of the supply seal plates 7e,f from the valve chamber of the body 75 as discussed above for the regulator 1. Also in the vent position, the vent supply seal 10 may be clear of the flow passage through the vent seal plate 6f, thereby allowing mud 17 from the downhole tool to flow to the annulus via the function ports of the body 75, the annular flow path of the valve chamber, and the passage of the vent seal plate 6f.

Figure 10:
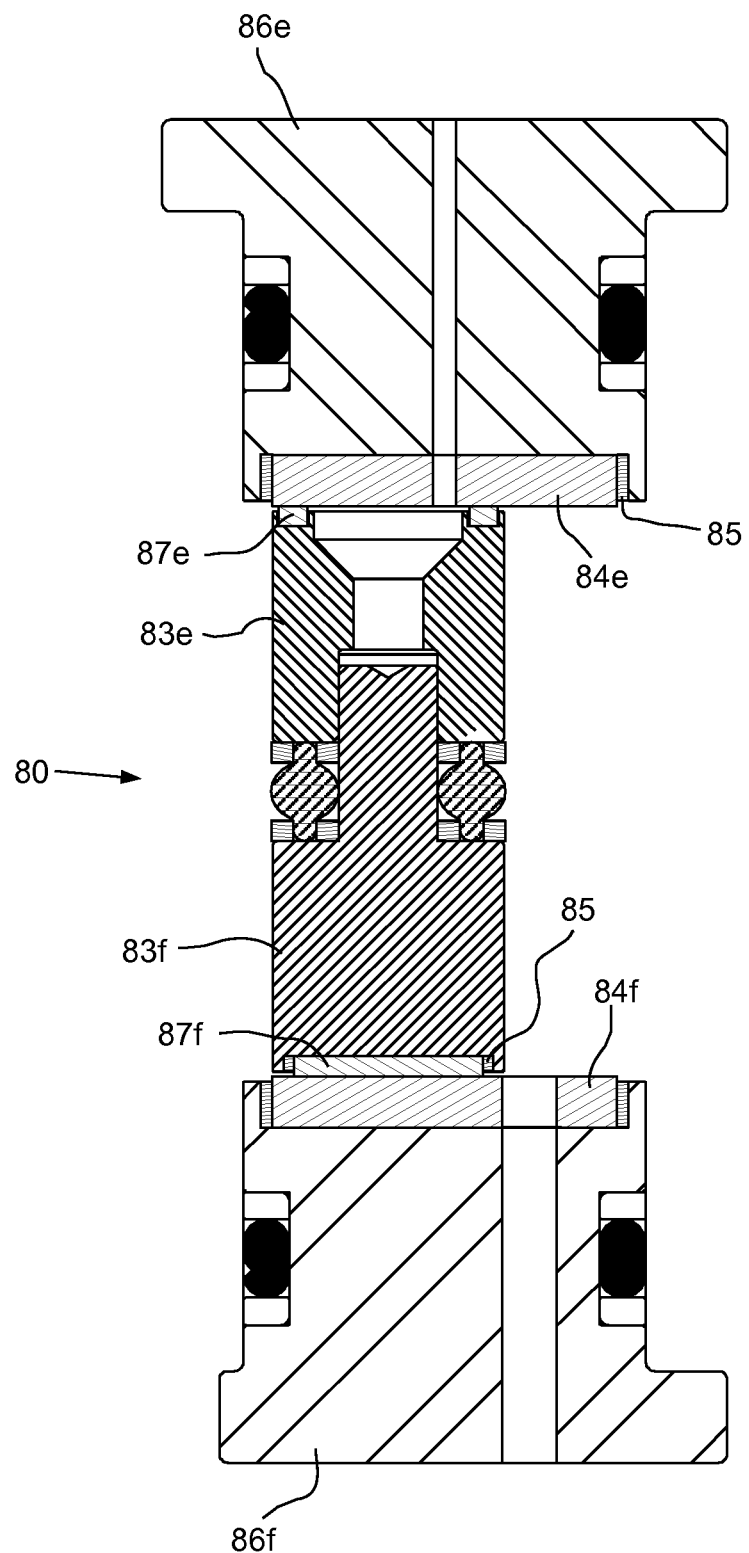
FIG. 10 illustrates an alternative sliding seal and seal plates suitable for use with the regulator and/or third control valve, according to another embodiment of the present disclosure.

FIG. 10 illustrates an alternative sliding seal 80 and seal plates 86e,f suitable for use with the regulator 1 and/or third control valve, according to another embodiment of the present disclosure. The alternative sliding seal 80 and seal plates 86e,f may replace the vent sliding seal 10 and the vent seal plates 6e,f and/or the supply sliding seal 11 and supply seal plates 7e,f.

The seal plates 86e,f may have grooves formed in ends thereof adjacent to the sliding seal 80 and inserts 84e,f may be disposed in the respective grooves allowing the seal plates 86e,f to be made one of the metals or alloys discussed above. The inserts 84e,f may be made from an abrasion resistant material, such as a cermet or ceramic. The cermet may be tungsten carbide and the ceramic may be synthetic corundum. The inserts 84e,f may be attached, such as brazed 85, to the respective seal plates 86e,f. The inserts 84e,f may each have a height corresponding to a height of the respective groove, such as being equal to or slightly greater than, such that the inserts are flush with the respective seal plates 86e,f or protrude from the grooves to engage the sliding seal 80. Each insert 84e,f may be cylindrical and have a central passage formed therethrough corresponding to the passage of the respective seal plate 86e,f.

The mechanical seals 83e,f may have grooves formed in ends thereof adjacent to the seal plates 86e,f and inserts 87e,f may be disposed in the respective grooves allowing the mechanical seals to be made one of the metals or alloys discussed above. The inserts 87e,f may be made from an abrasion resistant material, such as a cermet or ceramic. The cermet may be tungsten carbide and the ceramic may be synthetic corundum. The inserts 87e,f may be attached, such as brazed 85, to the respective mechanical seals 83e,f. The inserts 87e,f may each have a height corresponding to a height of the respective groove, such as being equal to or slightly greater than, such that the inserts are flush with the respective mechanical seals 83e,f or protrude from the grooves to engage the seal plates 86e,f. Each insert 87e,f may be cylindrical and have a central passage formed therethrough corresponding to the passage of the respective mechanical seal 83e,f.

Alternatively, the inserts 84e,f, 87e,f may be made from cubic boron nitride or synthetic diamond instead of the ceramic or cermet.

While the foregoing is directed to embodiments of the present disclosure, other and further embodiments of the disclosure may be devised without departing from the basic scope thereof, and the scope of the invention is determined by the claims that follow.

The invention claimed is:

1. A pressure regulator for dirty fluid service, comprising:
   a body having a chamber including a pilot portion and a regulated portion, a pair of supply sockets, and an outlet port, each socket and the port formed through a wall of the body;
   a pair of supply seal plates disposed in the supply sockets, each having a supply passage formed therethrough;
   a sliding seal assembly disposed in the chamber and comprising:
      a seal carrier having a piston and a supply gland; and
      a supply seal disposed in the supply gland;
   wherein:
      the piston is disposed in the pilot portion of the chamber,
      the outlet port and sockets are located adjacent to the regulated portion of the chamber,
   the piston is operable to move the sliding seal assembly between a supply position and a second position in response to pressure difference between the pilot portion and the regulated portion; wherein:
      one of the supply passages is a flow passage,
      one of the supply passages is an energization passage,
      the supply seal comprises a mechanical seal ring located adjacent to the energization passage and a mechanical seal peg located adjacent to the flow passage,
      the seal peg is clear of the flow passage in the supply position and covers the flow passage in the second position, and
         a bore of the seal ring is aligned with the energization passage in both positions.

2. The regulator of claim 1, wherein:
   the sliding seal assembly further comprises a spring-seal disposed between the seal ring and the seal peg,
   the spring-seal comprises a key seal and two pairs of backup rings, and
   each pair of backup rings straddles a respective lobe of the key seal.

3. The regulator of claim 1, wherein the mechanical seal ring, the mechanical seal peg, and the seal plates are made from a cermet.

4. The regulator of claim 1, wherein
   each seal plate has a groove formed in a face thereof adjacent to the regulated portion,
   the sliding seal assembly further comprises an insert disposed in each groove and attached to the respective seal plate, and
   each insert is made from synthetic corundum.

5. The regulator of claim 1, wherein:
   the body further has a pair of vent sockets formed through the wall thereof,
   the regulator further comprises a pair of vent seal plates disposed in the vent sockets, each having a vent passage formed therethrough, and the second position is a vent position.

6. The regulator of claim 5, wherein:
   one of the supply passages is open to the regulated portion in the supply position,
   both of the supply passages are closed to the regulated portion in the vent position,
   one of the vent passages is open to the regulated portion in the vent position, and
   both of the vent passages are closed to the regulated portion in the supply position.

7. The regulator of claim 5, wherein:
   the piston is further operable to move the sliding seal assembly to an equilibrium position,
   both of the supply passages and both of the vent passages are closed to the regulated portion in the equilibrium position.

8. The regulator of claim 1, further comprising a cap having a coupling formed in an outer surface thereof for connecting the body to a pocket of a control sub.

9. The regulator of claim 8, further comprising the control sub for assembly with a drill string and having:
   a set point chamber in fluid communication with a pilot port formed through a wall of the body,
   a passage providing fluid communication between the supply sockets and a bore of the drill string, and
   a passage providing fluid communication between the outlet port and a downhole tool of the drill string.

10. The regulator of claim 1, wherein:
    each supply socket is threaded, and
    the regulator further comprises a pair of nuts screwed into the sockets for retaining the supply seal plates therein.

* * * * *